United States Patent
Morizawa et al.

(10) Patent No.: US 8,458,110 B2
(45) Date of Patent: Jun. 4, 2013

(54) VERIFICATION SUPPORT APPARATUS, VERIFICATION SUPPORT METHOD, AND COMPUTER PRODUCT

(75) Inventors: Rafael Kazumiti Morizawa, Kawasaki (JP); Ryousuke Oishi, Kawasaki (JP); Akio Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 953 days.

(21) Appl. No.: 12/332,960

(22) Filed: Dec. 11, 2008

(65) Prior Publication Data

US 2009/0259610 A1    Oct. 15, 2009

(30) Foreign Application Priority Data

Apr. 10, 2008    (JP) ................. 2008-102727

(51) Int. Cl.
*G06N 5/00*    (2006.01)
(52) U.S. Cl.
USPC ............................................... 706/46; 706/45
(58) Field of Classification Search
USPC ...................................... 706/46, 45
See application file for complete search history.

(56) References Cited

FOREIGN PATENT DOCUMENTS

| JP | 10-40316 A | 2/1998 |
| JP | A 11-39363 | 2/1999 |
| JP | A 2002-14847 | 1/2002 |
| JP | 2005-250946 A | 9/2005 |
| JP | A 2006-252489 | 9/2006 |

OTHER PUBLICATIONS

Dwyer, Data Flow Analysis for Verifying Correctness Properties of Concurrent Programs, Doctoral Thesis, University of Massachusetts Amherst, 1995, pp. 1-305.*
Clarke, et al., Verification Tools for Finite—State Concurrent Systems, vol. 803 of Lecture Notes in Computer Science: "A Decade of Concurrency: Reflections and Perspectives"—REX School/Symposium Proceedings; Noordwijkerhout, The Netherlands, Springer-Verlag, Jun. 1-4, 1993, pp. 124-175.*
Japanese Office Action mailed Dec. 11, 2012 for corresponding Japanese Application No. 2008-102727, with Partial English-language Translation.

* cited by examiner

*Primary Examiner* — Wilbert L Starks
(74) *Attorney, Agent, or Firm* — Fujitsu Patent Center

(57) ABSTRACT

A verification support apparatus includes an identifying unit that, by using a pre-change specification and a post-change specification given before and after a specification change in a subject to be verified, identifies an area that has changed from among a plurality of specification items included in the post-change specification and a selecting unit that selects a specification item from among the areas identified by the identifying unit. The verification support apparatus further includes a searching unit that, by referring a transition graph concerning the specification items included in the post-change specification and by tracing specification items as origins of transitions from a starting point that is the specification item selected by the selecting unit, searches for a route made up of specification items affected by the specification change; and an output unit that outputs a search result of the searching unit.

9 Claims, 22 Drawing Sheets

FIG.8

```xml
<?xml version="1.0"?>
<SystemSpecification>
<Name>DMA CONTROLLER</Name>
<Function>
  <Name>EXECUTE HARDWARE RESET</Name>
  <ReferencedScenario/>
  <Scenario>
    <Name>Reset</Name>
    <Precondition/>
    <Postcondition>VALUE OF EVERY INPUT/OUTPUT PARAMETER IS 0</Postcondition>
    <Invariant/>
    <OperationSet>
      <Name>SET TRANSFER PARAMETER</Name>
      <Precondition><![CDATA[start == 0 && flag == 0]]></Precondition>
      <Postcondition><![CDATA[ size % 16 == 0 && size <= 1024 && start == 1]]></Postcondition>
      <Invariant/>
      <ArgumentList>
        <Argument>channel</Argument>
        <Argument>priority</Argument>
        <Argument>sourceAddress</Argument>
        <Argument>destinationAddress</Argument>
        <Argument>size</Argument>
        <Argument>start</Argument>
      </ArgumentList>
      <Operation>
        <Name>READ ONE BATCH OF DATA FROM TRANSFER ORIGIN ADDRESS</Name>
        <Precondition/>
        <Postcondition/>
        <Invariant/>
        <ArgumentList/>
        <ReferredFunction/>
        <ReferredScenario>CHANNEL TRANSFER</ReferredScenario>
      </Operation>
      </ReferredScenario>
      <Operation>
        <Name>WRITE ONE BATCH OF DATA TO TRANSFER DESTINATION ADDRESS</Name>
        <Precondition/>
        <Postcondition/>
        <Invariant/>
        <ArgumentList></ArgumentList>
        <ReferredFunction/>
        <ReferredScenario>CHANNEL TRANSFER</ReferredScenario>
      </Operation>
      </ReferredScenario>
      <Operation>
        <Name>EXECUTE DMA TRANSFER</Name>
        </ArgumentList>
        <ReferredFunction/>
        <ReferredScenario>CHANNEL TRANSFER</ReferredScenario>
      </Operation>
      </ReferredScenario>
      <Operation>
        <Name>SET TRANSFER END FLAG</Name>
        <Precondition><![CDATA[ start == 0 && flag == 0]]>
        <Postcondition><![CDATA[ start == 0 && flag == 1]]>
      </Precondition>
      <Postcondition>
      <Invariant/>
      <ArgumentList/>
      <ReferredFunction/>
      <ReferredScenario>CHANNEL TRANSFER</ReferredScenario>
      </ReferredScenario>
      </Operation>
    </OperationSet>
  </Scenario>
</Function>
</SystemSpecification>
```

```
<?xml version="1.0"?>
<SystemSpecification>
   <Name>DMA CONTROLLER</Name>
   <Function>
      <Name>EXECUTE HARDWARE RESET</Name>
      <ReferencedScenario/>
      <Scenario>
         <Name>Reset</Name>
         <Precondition/>
         <Postcondition>VALUE OF EVERY INPUT/OUTPUT PARAMETER IS 0
</Postcondition>
         <Invariant/>
         <OperationSet>
            <Operation>
               <Name>INITIALIZE INPUT PARAMETER AND INTERRUPTION FLAG
</Name>
               <Precondition/>
               <Postcondition>INPUT PARAMETER AND INTERRUPTION FLAG ARE 0
</Postcondition>
               <Invariant/>
```

```
               <ReferredFunction/>
               <ReferredScenario>DMA TRANSFER</ReferredScenario>
            </Operation>
            <Operation>
               <Name>EXECUTE DMA TRANSFER THROUGH CORRESPONDING
CHANNEL</Name>
               <Precondition><![CDATA[ start == 1]]></Precondition>
               <Postcondition><![CDATA[ start == 0 && flag == 1]]></Postcondition>
               <Invariant/>
               <ArgumentList/>
               <ReferredFunction>EXECUTE DMA TRANSFER THROUGH
CORRESPONDING CHANNEL</ReferredFunction>
               <ReferredScenario>DMA TRANSFER</ReferredScenario>
            </Operation>
         </OperationSet>
      </Scenario>
   </Function>
```

1101

```
   <Function>
      <Name>INTERRUPTION GENERATION</Name>
      <ReferencedScenario>CHANNEL TRANSFER FOLLOWED BY INTERRUPTION
</ReferencedScenario>
      <Scenario>
         <Name>INTERRUPTION</Name>
         <Precondition><![CDATA[flag == 1]]></Precondition>
         <Postcondition><![CDATA[flag == 0]]></Postcondition>
         <Invariant><![CDATA[start == 0]]></Invariant>
         <OperationSet>
            <Operation>
               <Name>SET INTERRUPTION FACTOR</Name>
               <Precondition><![CDATA[cause == 0 ]]></Precondition>
               <Postcondition><![CDATA[cause == 1]]></Postcondition>
               <Invariant/>
                  .
                  .
                  .
```

```
--- SampleSpec.xml              2007-12-20 20:20:09.000005000 +0900
+++ SpecVariation2.xml          2008-02-01 14:40:07.000005000 +0900
@@ -13,7 +13,7 @@
        <Invariant/>
        <OperationSet>
          <Operation>
            <Name>INITIALIZE INPUT PARAMETER</Name>
            <Precondition/>
-           <Postcondition>INPUT PARAMETER IS 0</Postcondition>
+           <Postcondition>INPUT PARAMETER AND INTERRUPTION FLAG ARE 0
</Postcondition>
            <Invariant/>
            <ArgumentList/>
            <ReferredFunction/>
```

```
@@ -124,5 +124,106 @@
          </Operation>
        </OperationSet>
      </Scenario>
+     <Scenario>
+       <Name>CHANNEL TRANSFER FOLLOWED BY INTERRUPTION</Name>
+       <Precondition><![CDATA[start == 1]]></Precondition>
+       <Postcondition><![CDATA[start == 0]]></Postcondition>
+       <Invariant/>
+       <OperationSet>
```

```
+  <Function>
+    <Name>INTERRUPTION GENERATION</Name>
+    <ReferencedScenario>CHANNEL TRANSFER FOLLOWED BY INTERRUPTION
</ReferencedScenario>
+    <Scenario>
+      <Name>INTERRUPTION</Name>
+      <Precondition><![CDATA[flag == 1]]></Precondition>
+      <Postcondition><![CDATA[flag == 0]]></Postcondition>
+      <Invariant><![CDATA[start== 0]]></Invariant>
+      <OperationSet>
+        <Operation>
              .
              .
              .
```

VERIFICATION SUPPORT APPARATUS, VERIFICATION SUPPORT METHOD, AND COMPUTER PRODUCT

CROSS-REFERENCE TO RELATED APPLICATIONS

This application is based upon and claims the benefit of priority from the prior Japanese Patent Application No. 2008-102727, filed on Apr. 10, 2008, the entire contents of which are incorporated herein by reference.

BACKGROUND OF THE INVENTION

1. Field of the Invention

The present invention relates to a technique of supporting verification of specifications for a design subject, such as software and hardware.

2. Description of the Related Art

Recently in the development of software and hardware, the scale of software and hardware as design subjects has been getting larger due to the progress of design technologies. Meanwhile, the ratio of a verification process with respect to the entire development process tends to be increasing. In the verification process, whether a design subject operates according to specifications is verified using a scenario created by a designer.

A specification of the design subject may be changed because of a discovered bug, a user request, etc. Such a case brings a need of recreating a test scenario in line with the specification change and re-verifying the design subject. However, if re-verification is performed on all test items every time a specification is changed, labor costs required for a regression test become enormous.

To improve work efficiency in a regression test conducted in the wake of a specification change, conventional techniques of selecting and executing a test scenario with a higher priority order have been provided.

However, according to the conventional techniques described in Japanese Patent Application Laid-Open Publication Nos. 2002-014847, H11-39363, and 2006-252489, the priority order of test scenarios given to a subject to be verified is not calculated in line with a specification change bringing about a problem of difficulty in identifying an area that is affected indirectly by the specification change. As a result, labor costs required for a regression test still increase, leading to a problem of a prolonged design period.

SUMMARY OF THE INVENTION

It is an object of the present invention to at least solve the above problems in the conventional technologies.

A computer-readable recording medium according to one aspect of the present invention stores therein a verification support program that causes a computer to execute identifying, by using a pre-change specification and a post-change specification given before and after a specification change in a subject to be verified, an area that has changed from among a plurality of specification items included in the post-change specification; selecting a specification item from among the areas identified at the identifying; searching for, by referring a transition graph concerning the specification items included in the post-change specification and by tracing the specification items as origins of transitions from a starting point that is the specification item selected at the selecting, a route made up of specification items affected by the specification change; and outputting a search result of the searching.

A verification support apparatus according to another aspect of the present invention includes an identifying unit that, by using a pre-change specification and a post-change specification given before and after a specification change in a subject to be verified, identifies an area that has changed from among a plurality of specification items included in the post-change specification; a selecting unit that selects a specification item from among the areas identified by the identifying unit; a searching unit that, by referring a transition graph concerning the specification items included in the post-change specification and by tracing specification items as origins of transitions from a starting point that is the specification item selected by the selecting unit, searches for a route made up of specification items affected by the specification change; and an output unit that outputs a search result of the searching unit.

A verification support method according to still another aspect of the present invention includes identifying, by using a pre-change specification and a post-change specification given before and after a specification change in a subject to be verified, an area that has changed from among a plurality of specification items included in the post-change specification; selecting a specification item from among the areas identified at the identifying; searching for, by referring a transition graph concerning the specification items included in the post-change specification and by tracing specification items as origins of transitions from a starting point that is the specification item selected at the selecting, a route made up of specification items affected by the specification change; and outputting a search result of the searching.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a view of a pre-change specification of a DMA controller;

FIG. 11 is a view of a post-change specification of the DMA controller;

FIG. 14 is a view of a difference set of the first example;

DETAILED DESCRIPTION OF THE PREFERRED EMBODIMENTS

Referring to the accompanying drawings, exemplary embodiments according to the present invention are explained in detail below.

In the present embodiment, a function affected by a specification change in a subject to be verified, such as software and hardware, is searched for, and a test scenario for verifying the operation of the function is identified. Through this process, test scenarios needed for re-verification are narrowed down.

Figure 1:
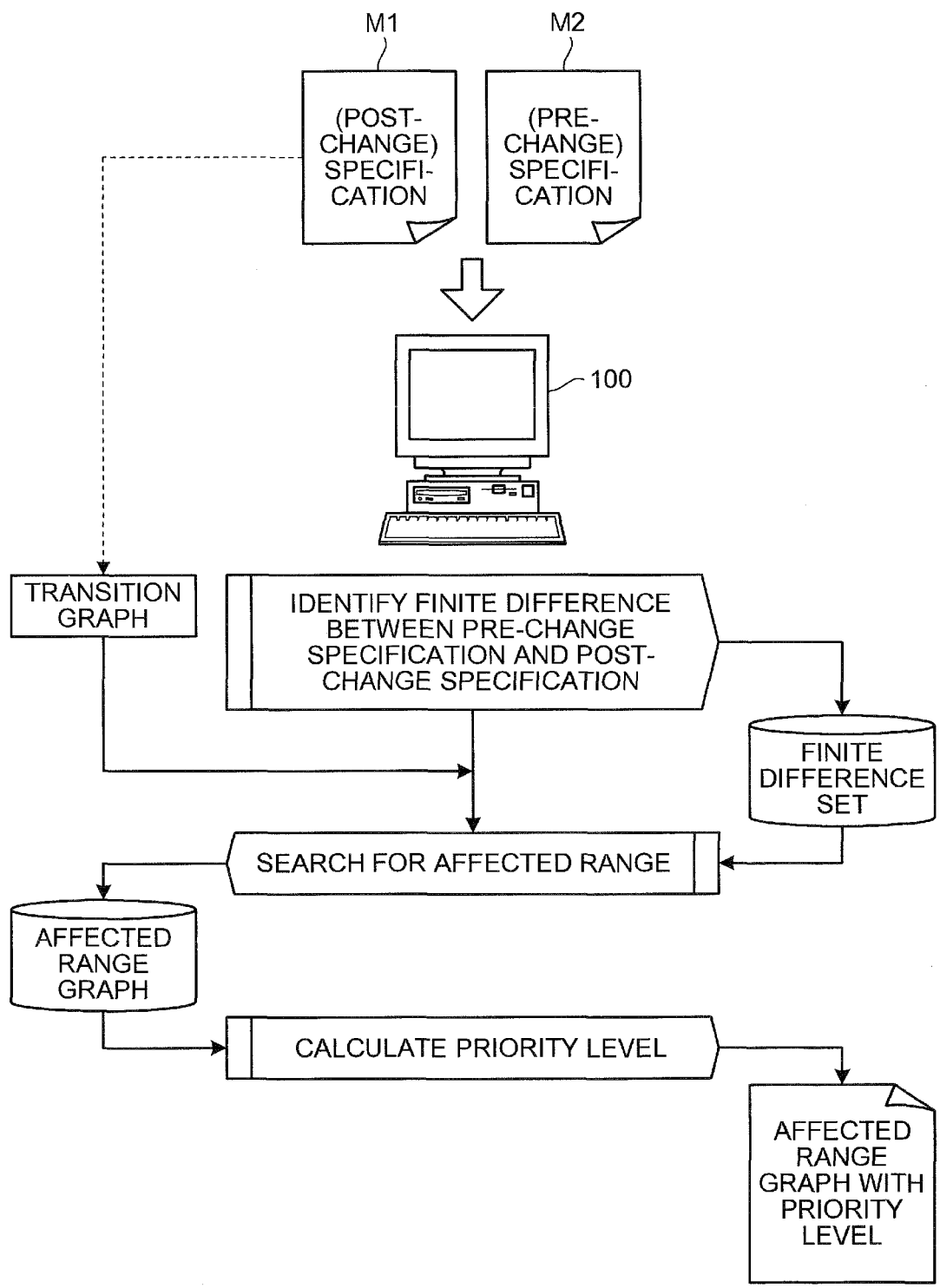
FIG. 1 is a schematic of a present embodiment.

FIG. 1 is a schematic of the present embodiment. As depicted in FIG. 1, a verification support apparatus 100 receives input of specifications M1 and M2 that are respectively the specifications after and before a specification change in a subject to be verified, such as software and hardware.

Subsequently, the verification support apparatus 100 identifies differences between the post-change specification M1 and the pre-change specification M2 and saves the differences as a difference set (i.e., areas that have changed as result of the specification change). The verification support apparatus 100 then refers to a transition graph concerning the post-change specification M1 to search for a range affected by areas that have changed and are saved as the difference set.

By graphing retrieved ranges, the verification support apparatus 100 generates an affected range graph that identifies specification items affected by the specification change. The verification support apparatus 100 calculates, based on a distance (number of transitions) between a specification item (scenario) of an area that has changed and another specification item reached in the affected range graph, the priority level of each specification item (scenario) in the affected range graph. Finally, the verification support apparatus 100 outputs an affected range graph in which a priority level is appended to each specification item.

In the present embodiment, as described above, each function affected by a specification change is identified comprehensively, and a priority level representing the necessity of re-verification is calculated for each scenario, thereby enabling systematic identification of a test scenario needed to be re-verified. Consequently, the preset priority order of test scenarios (e.g., priority order set based on the attributes of scenarios) is changed according to a specification change and scenarios needed for re-verification are narrowed down to improve the efficiency of verification work.

Figure 2:
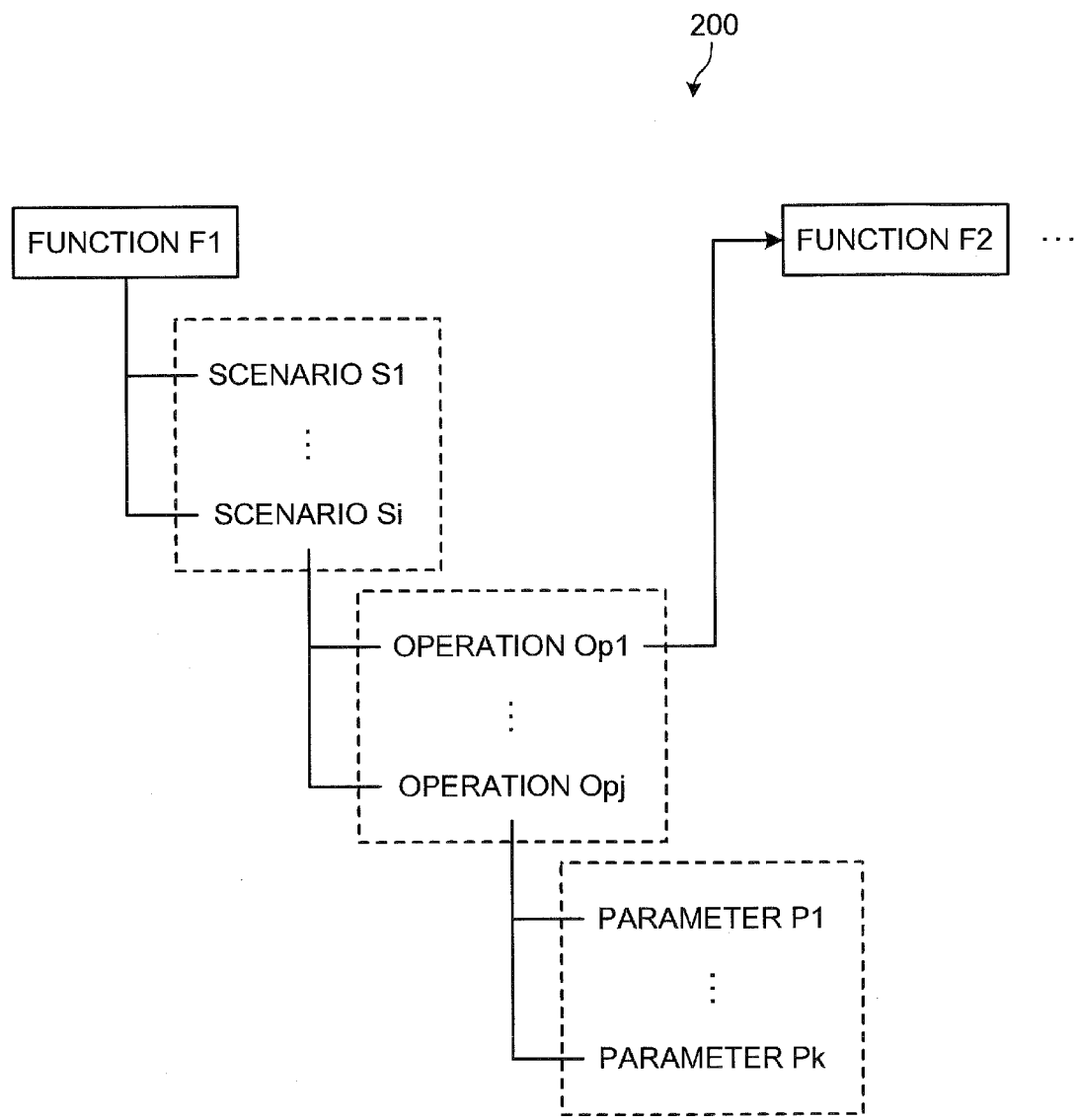
FIG. 2 is a view of a modeled data structure of a specification.

FIG. 2 is a view of a modeled data structure of a specification. As depicted in FIG. 2, a specification model 200 represents a hierarchical structure including functions F1, F2, ..., scenarios S1, ..., Si, operations Op1, ..., Opj, and parameters P1, ..., Pk.

A function F (e.g., function F1) includes a scenario S (e.g., scenario S1, ..., Si), which has any one of attributes of basic, alternative, and exception, with an execution condition (pre-condition, post-condition, and invariable condition) defined for each attribute. Each scenario S has a test pattern corresponding and belonging thereto. The scenario S includes an operation Op (e.g., Op1, ..., Opj) for realizing each function F.

The operation Op is an operation that is executed to implement the function F, representing the order of execution of the function F. For each operation, an execution condition (pre-condition, post-condition, and invariable condition) is defined. The operation Op may be a basic operation or an operation for calling up another function F. A parameter P is an argument given to the operation Op.

Figure 3:
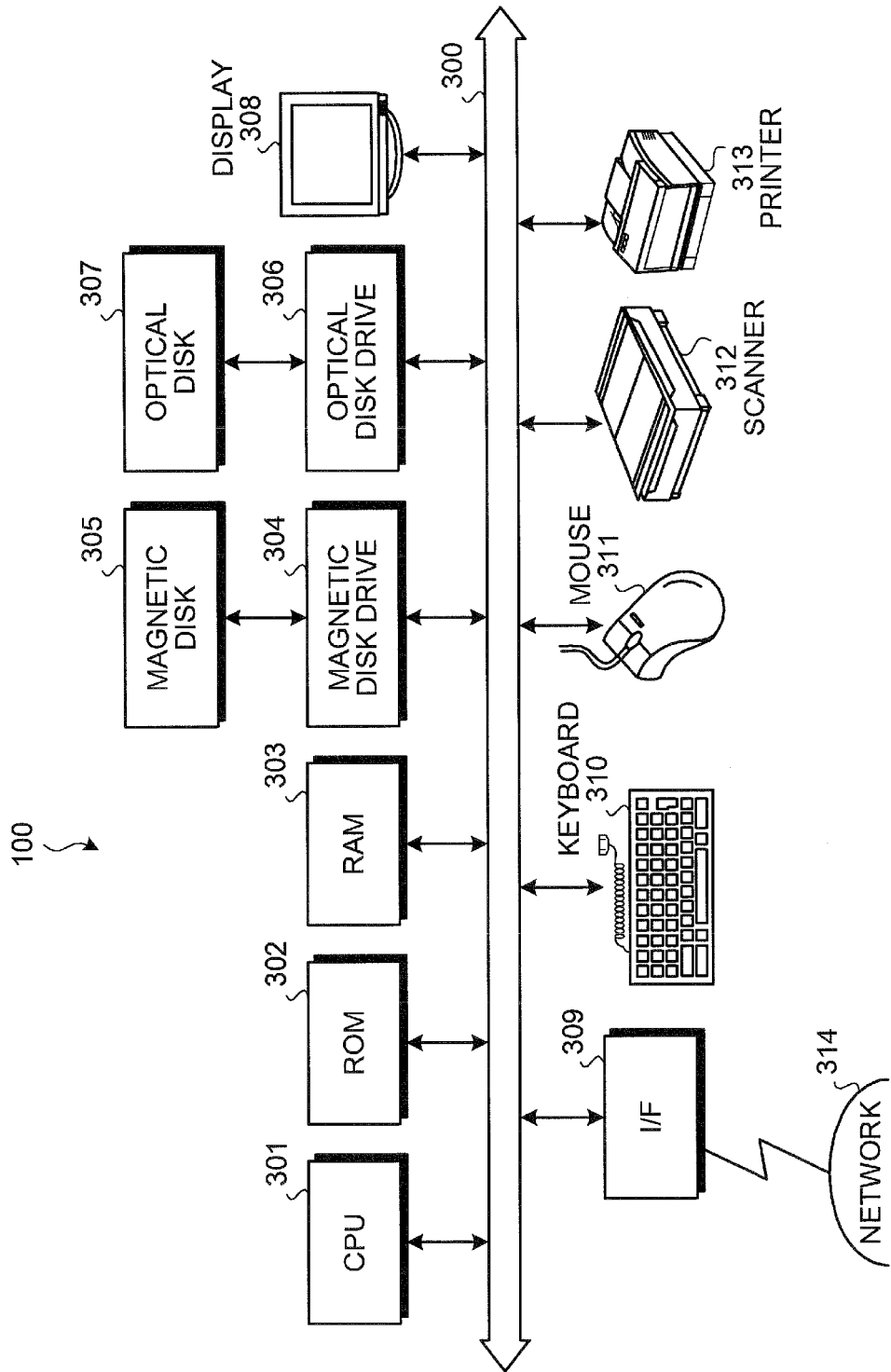
FIG. 3 is diagram of a hardware configuration of a verification support apparatus.

FIG. 3 is diagram of a hardware configuration of the verification support apparatus. As depicted in FIG. 3, the verification support apparatus 100 includes a central processing unit (CPU) 301, a read-only memory (ROM) 302, a random access memory (RAM) 303, a magnetic disc drive (hard disc drive) 304, a magnetic disc (hard disc) 305, an optical disc drive (flexible disc drive) 306, an optical disc (flexible disc) 307, a display 308, an interface (I/F) 309, a keyboard 310, a mouse 311, a scanner 312, and a printer 313. These component units are interconnected via a bus 300.

The CPU 301 assumes overall control of the verification support apparatus 100. The ROM 302 stores therein a program such as boot program. The RAM 303 is used as a work area for the CPU 301. The magnetic disc drive 304, under the control of the CPU 301, controls the reading/writing of data from/to the magnetic disc 305. The magnetic disc 305 stores data that is written thereto under the control of the magnetic disc drive 504.

The optical disc drive 306, under the control of the CPU 301, controls the reading/writing of data from/to the optical disc 307. The optical disc 307 stores data that is written thereto under the control of the optical disc drive 306, and allows a computer to read the data stored thereon.

The display 308 displays a cursor, icons, tool boxes, the data of documents, images, and functional information, etc. The display 308 may be, for example, a cathode ray tube (CRT), thin-film-transistor (TFT) liquid crystal display, plasma display, etc.

The I/F 309 is connected to a network 314, such as a local area network (LAN), wide area network (WAN), and the Internet, through a communication line, and is connected to another apparatus via the network 314. The I/F 309 assumes a function of interfacing the network 314 with the internal components of the verification support apparatus, and of controlling data input/output from/to an external apparatus. The I/F 309 may be, for example, a modem, LAN adaptor, etc.

The keyboard 310 has keys for entering characters, figures, various instructions, etc., and is used for data input. The keyboard 310 may be a touch-panel input pad, numeric keypad, etc. The mouse 311 is used to move the cursor, select a range, shift a window, and change window sizes. The mouse 311 may be a track ball, joy stick, etc., provided the device, as a pointing device, has identical functions to those of the mouse.

The scanner 312 optically reads an image, and takes image data into the verification support apparatus 100. The scanner 312 may have an optical character recognition (OCR) function. The printer 313 prints image data and document data. The printer 313 may be, for example, a laser printer or ink-jet printer.

Figure 4:
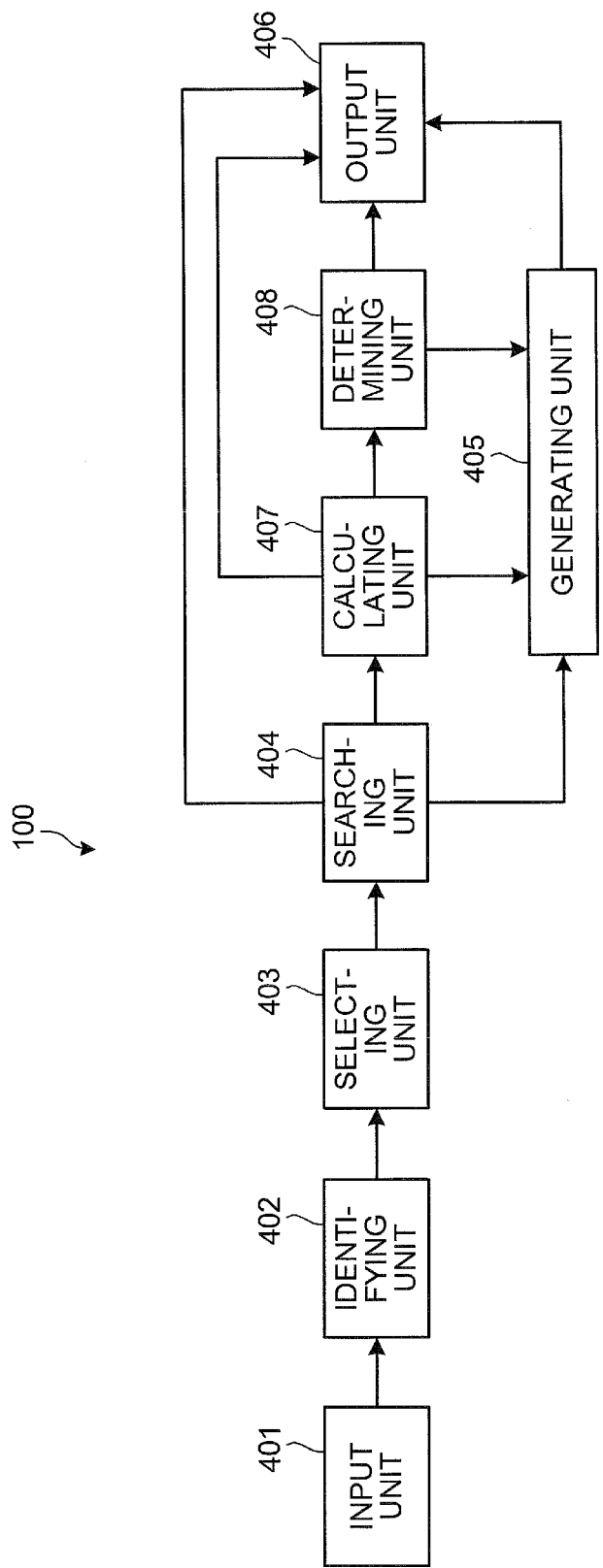
FIG. 4 is a functional diagram of the verification support apparatus.

FIG. 4 is a functional diagram of the verification support apparatus. The verification support apparatus 100 includes an input unit 401, an identifying unit 402, a selecting unit 403, a searching unit 404, a generating unit 405, an output unit 406, a calculating unit 407, and a determining unit 408. Specifically, the functions of these units working as a control unit (the input unit 401 to the determining unit 408) are implemented by, for example, causing the CPU 301 to execute a program stored in a memory area, such as the ROM 302, the RAM 303, the magnetic disc 305, and the optical disc 307, or by the I/F 309.

The input unit 401 has a function of receiving input of a specification describing the functions of a subject to be verified. A subject to be verified is, for example, hardware including a large-scale integrated (LSI) circuit, various software, etc., to be developed. A specification is, for example, electronic data written in the markup language, extensible markup language (XML).

Specifically, for example, the input unit 401 receives input of the post-change specification M1, which is the specification after a specification change in the subject to be verified and the pre-change specification M2, which is the specification before the specification change, as depicted in FIG. 1. The specifications M1 and M2 may be input directly to the verification support apparatus 100, or may be acquired from an external computer apparatus. The input specifications are stored in a memory area, such as the RAM 303, the magnetic disc 305, and the optical disc 307.

The specifications M1 and M2 include, for example, plural specification items that represent the functions (use cases), scenarios, operations, and parameters of the subject to be verified. A function means a function required for the subject to be verified. A scenario defines a series of operations that are executed to implement a function. For a function and a scenario, a precondition, a post-condition, and an invariable condition are defined.

A precondition is a condition to be satisfied (i.e., to be true) before execution of a series of operations for realization of a function. A post-condition is a condition to be satisfied after execution of a series of operations. An invariable condition is an invariable condition that is required during a period before the occurrence of a post-condition (i.e., period during which a series of operations are executed). When the specifications M1 and M2 are written in XML, each specification item is expressed as, for example, an element (or a group of elements) on which a start tag and an end tag are set.

Specification change means, for example, change, addition, or deletion of a function. A specification change is carried out as a specification change that affects other functions or as a specification change that does not affect other functions. A specification change affecting other functions includes, for example, change, addition, or deletion of a scenario. Specifically, a specification change affecting other functions may be carried out as a change in a precondition, post-condition, or invariable condition and as a change in a series of operations (e.g., change in the order of operation). Operation change may be carried out as a process of defining a new operation and inserting the defined operation in a series of operations. Operation change may also be carried out as a change in the specification of an operation. This case includes a change in an algorithm or in a parameter (such as a change in the number of arguments, a change in the effective range of a parameters, etc.)

The identifying unit 402 has a function of using the specifications M1 and M2 that are the specifications after and before a specification change in a subject to be verified to identify an area that has changed among plural specification items included in the post-change specification M1. Specifically, for example, the identifying unit 402 detects a difference between the specification M1 and the specification M2, using an existing difference detection program (e.g., diff command), to be able to identify an area that has changed as a result of the specification change. A difference set is thus formed, for example, as a set of specification items written in XML. An identified result is stored in the memory area, such as the RAM 303, the magnetic disc 305, and the optical disc 307.

Figure 5:
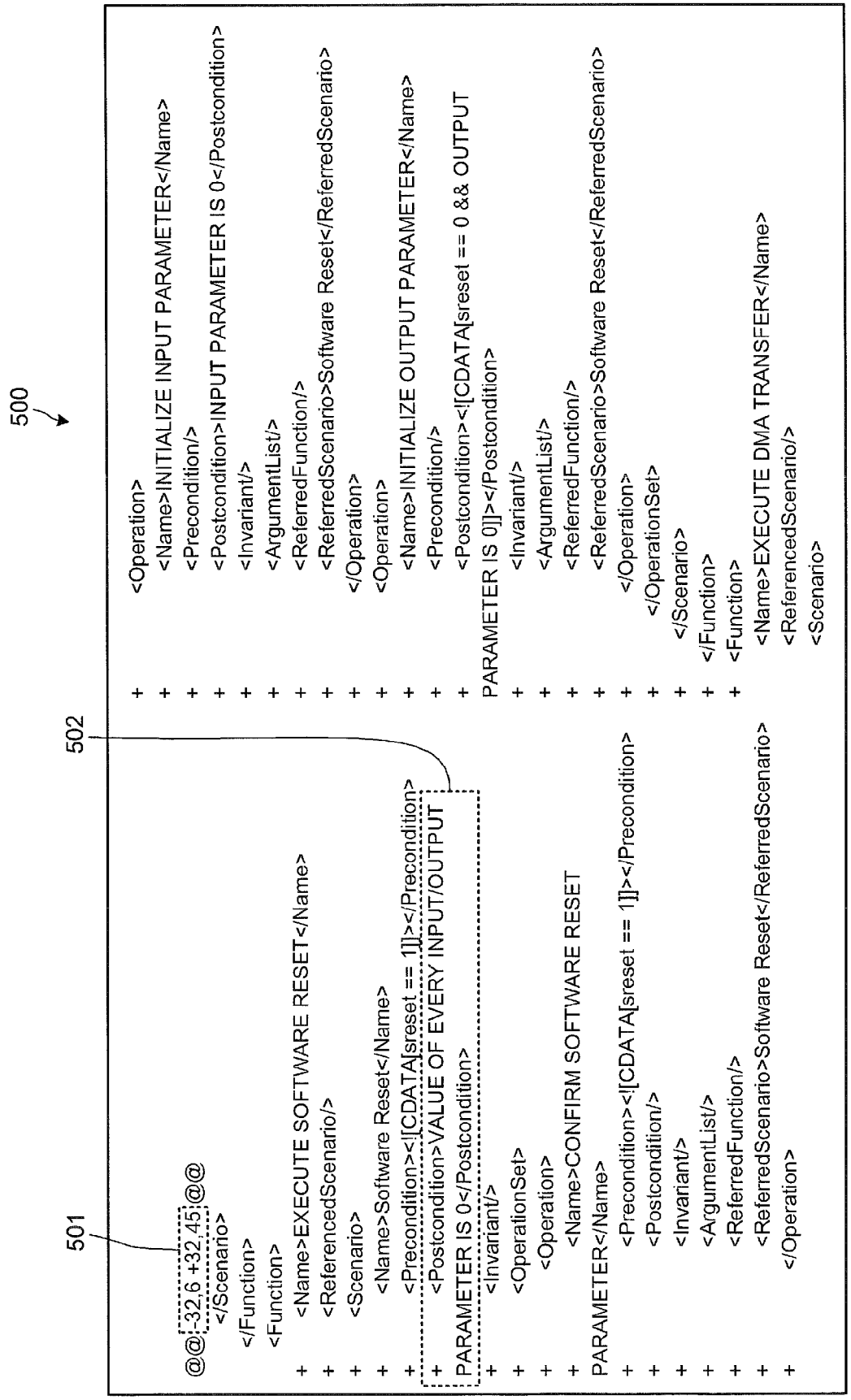
FIG. 5 is a view of an example of a difference set.

FIG. 5 is a view of an example of a difference set. As depicted in FIG. 5, a difference set 500 is a set of specification items representing differences between the specifications M1 and M2, which are the specifications after and before a specification change. The difference set 500 is the set of specification items written in XML.

In the difference set 500, specification items with "+" appended to the heads of the lines are specification items that are written in the post-change specification M1 only. Specification items with "−" appended to the heads of the lines (not depicted in FIG. 5) are specification items that are written in the pre-change specification M2 only.

In the difference set 500, numerical values 501 placed between reference numerals "@@" and "@@" are numerical values for specifying the number of lines in the specifications M1 and M2. By referring the numerical values 501, the position of an area that has changed in the specifications M1 and M2 can be identified. For example, the position of the changed area in the specifications M1 can be identified by referring to "+32, 45".

The selecting unit 403 has a function of selecting one specification item from among the areas identified by the identifying unit 402. For example, the selecting unit 403 selects one specification item from among the difference set 500 depicted in FIG. 5. Specifically, for example, any one of the specification items with XML tags of <Function>, <Scenario>, and <Operation> may be selected.

When a selected specification item is other than one of the specification items above, a superior XML tag to which the selected specification item belongs (i.e., superior XML tag equal to any one of the XML tags above) is identified, and a specification item with the identified superior XML tag is selected. For example, when a specification item 502 is selected from among the difference set 500, a superior XML tag <Scenario> to which the specification item 502 belongs is identified and selected. A selection result is stored in the memory area, such as the RAM 303, the magnetic disc 305, and the optical disc 307.

The searching unit 404 has a function of referring to a transition graph concerning specification items included in the post-change specification M1 and tracing specification items as the origins of transitions sequentially from a starting point, which is one specification item selected by the selecting unit 403, to search for a route made up of specification items affected by a specification change.

Specifically, the searching unit 404 traces the specification items as the origin of transitions sequentially from a starting point that is a specification item representing a scenario identified from a specification item to search for a route made up of the specification items affected by the specification change. When a specification item represents a function, the searching unit 404 identifies a specification item representing a scenario belonging to the function, and searches for a route for which the starting point is the identified specification item.

When a specification item represents an operation, the searching unit 404 searches for a route for which the starting point is a specification item representing a scenario to which the operation belongs. When a specification item represents a scenario, the searching unit 404 searches for a route for which the starting point is the specification item. A search result is stored in the memory area, such as the RAM 303, the magnetic disc 305, and the optical disc 307.

A transition graph is a directional graph that expresses, for example, the data structure of the specification model 200 depicted in FIG. 2. Specifically, for example, the transition graph may be made as a graph on which functions F and scenarios S are indicated as nodes to express the link relations between the nodes, based on the written contents of the specification M1.

The transition graph may be made as a graph on which only the scenarios S identified from specification items included in the specification M1 are indicated as nodes and the nodes are interconnected based on the link relations between functions F and scenarios S. The transition graph may be made as a graph expressing a data structure after a specification change, by adding a scenario identified from a specification item selected by the selecting unit 403 as a node to a transition graph expressing the data structure of the specification M2.

In a specific example, the search process by the searching unit 404 is carried out, for example, in such a way that with reference to a transition graph using a conventional search algorithm, link relations are traced backward from a node representing a scenario that is a starting point to search for a route made up of nodes representing specification items affected by a specification change. A specific example of a transition graph and a search result will be explained in an example of the embodiment to be described later.

The generating unit 405 has a function of generating, based on a search result given by the searching unit 404, an affected range graph that identifies a range affected by a specification change. Specifically, for example, the generating unit 405 connects plural routes retrieved by the searching unit 404 to make the affected range graph that identifies the range affected by the specification change. A generated graph is stored in the memory area, such as the RAM 303, the magnetic disc 305, and the optical disc 307. A specific example of the affected range graph will be explained in an example of the embodiment to be described later.

The output unit 406 has a function of outputting a search result given by the search unit 404. Specifically, for example, the output unit 406 may output a list of scenarios present on a route retrieved by the search unit 404, or may output the affected range graph generated by the generating unit 405. The form of output by the output unit 406 is any one of on-screen display on the display 308, printout at the printer 313, data output (saving) to a memory, and transmission to an external computer apparatus.

A designer is able to identify a function affected by a specification change by referring an output result (e.g., affected range graph) from the output unit 406. Thus, the designer can identify a scenario for a function having a high possibility of developing trouble and thereby narrow down test scenarios needed to be re-verified (as test scenarios belong to scenarios).

The calculating unit 407 has a function of calculating, based on the number of transitions made between one specification item and another specification item to be reached on a route retrieved by the search unit 404, a priority level representing the necessity of verification of a specification item on a route. Specifically, the calculating unit 407 traces, backward, links extending from a scenario (specification item) as a starting point to another specification item on the route to count the number of transitions made between the starting point and each scenario (specification item) and calculate a priority level using the result of counting.

The counted number of transitions may be taken to be the priority level of each specification item. In such a case, a larger counted number means a lower priority level, and a smaller counted number means a higher priority level. Based on the counted number of transitions, a priority level may be calculated as a numerical value that becomes larger as the number of transition becomes less. A calculated result is stored in the memory area, such as the RAM 303, the magnetic disc 305, and the optical disc 307.

The determining unit 408 has a function of relatively evaluating plural priority levels to determine the priority level of a specification item on a route when the calculating unit 407 has calculated the priority level of the specification item on the route plural times. Specifically, when plural priority levels are calculated for one scenario, the determining unit 408 determines the highest priority level among the priority levels to be the priority level of the scenario. A determination result is stored in the memory area, such as the RAM 303, the magnetic disc 305, and the optical disc 307.

The output unit 406 has a function of outputting a calculation result given by the calculating unit 407 (or determination result given by the determining unit 408). Specifically, the output unit 406 may output a calculation result that associates a scenario with a priority, or output an affected range graph generated by the generating unit 405 as a graph on which a priority is appended to each scenario.

By referring to an output result from the output unit 406 (e.g., affected range graph to which priorities are appended), the designer can identify the priority level of a scenario for a function having a possibility of developing trouble and thus, is able to recognize the priority order of test scenarios to be re-verified. Thereby, the designer can to further narrow down the test scenarios that need to be re-verified.

Figure 6:
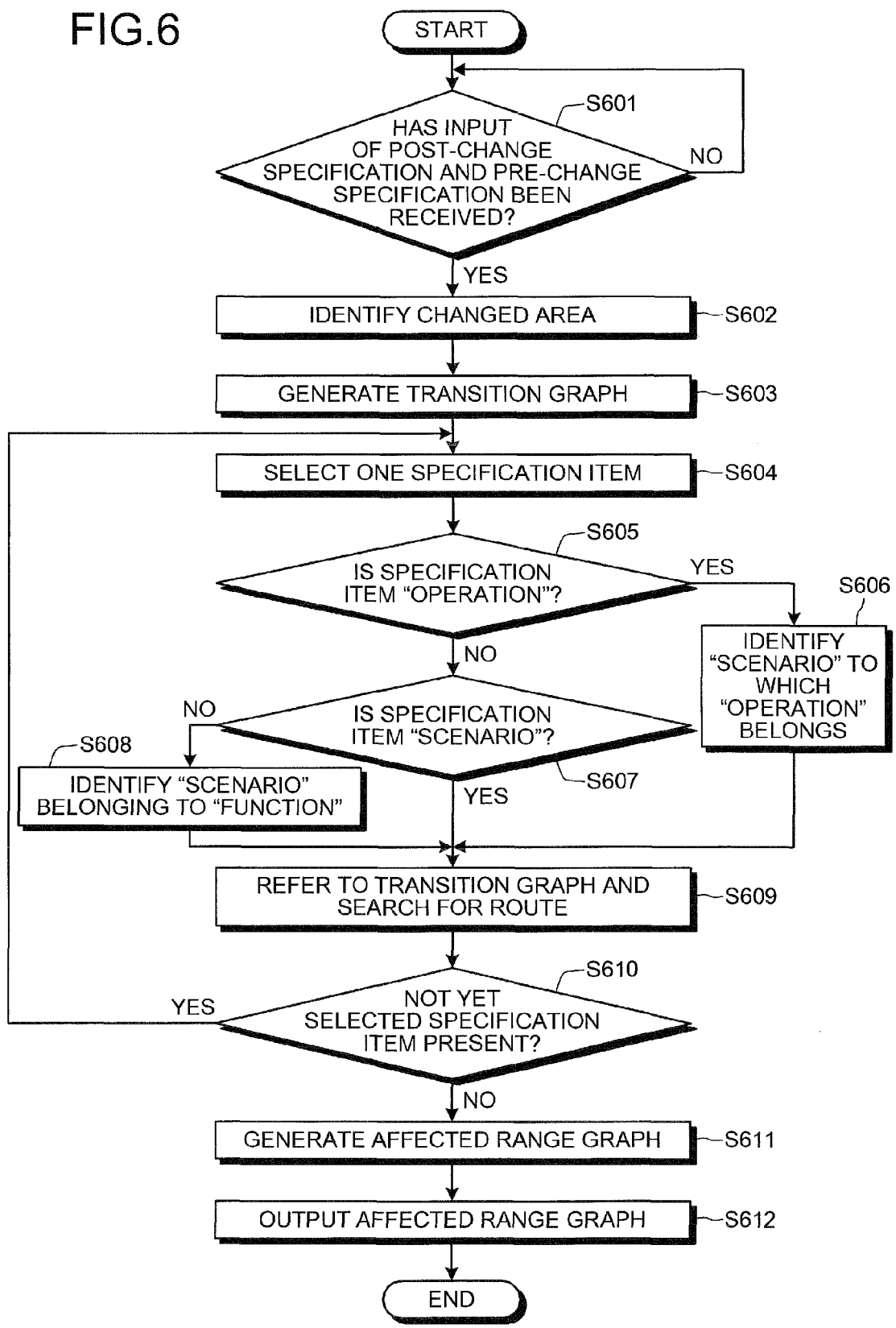
FIG. 6 is a flowchart of an example of a verification support procedure by the verification support apparatus.

FIG. 6 is a flowchart of an example of a verification support procedure by the verification support apparatus. As depicted in FIG. 6, whether the input unit 401 has received input of the specifications M1 and M2, which are the specifications after and before a specification change, is determined (step S601).

The verification support apparatus waits until the specifications M1 and M2 are input to the verification support apparatus (step S601: NO). When the specifications M1 and M2 are input (step S601: YES), the identifying unit 402 detects a difference between the specification M1 and the specification M2 to identify an area that has changed as a result of a specification change in a subject to be verified (step S602). Then, a transition graph concerning specification items included in the post-change specification M1 is generated (step S603).

Subsequently, the selecting unit 403 selects one specification item from among the areas identified by the identifying unit 402 (step S604). When the selected specification item is "operation" (step S605: YES), the selecting unit 403 refers to the specification M1 to identify a "scenario" to which the "operation" belongs (step S606), after which the procedure proceeds to step S609.

When the selected specification item is not "operation" (step S605: NO), the selecting unit 403 determines whether the specification item is "scenario" (step S607). When the specification item is not "scenario" (step S607: NO), the selecting unit 403 refers to the specification M1 to identify a "scenario" that belongs to a "function" represented by the specification item (step S608), after which the procedure proceeds to step S609.

When the selected specification item is "scenario" (step S607: YES), the searching unit 404 refers to the transition graph generated at step S603 and traces specification items as the origins of transitions sequentially from a starting point that is the selected "scenario" (or the "scenario" specified at step S606 or at step S608) to search for a route made up of specification items affected by a specification change (step S609).

Subsequently, whether a specification item that has yet to be selected is present among the areas identified at step S602 is determined (step S610). When a specification item is present (step S610: YES), the procedure returns to step S604, where one specification item is selected from among specification items that have yet to be selected.

When no specification item that has yet to be selected remains (step S610: NO), the generating unit 405 generates, based on the search result given at step S609 (step S611) an affected range graph that identifies a range affected by the specification change. The output unit 406 then outputs the generated affected range graph (step S612) to end a series of processes according to the flowchart.

Figure 7:
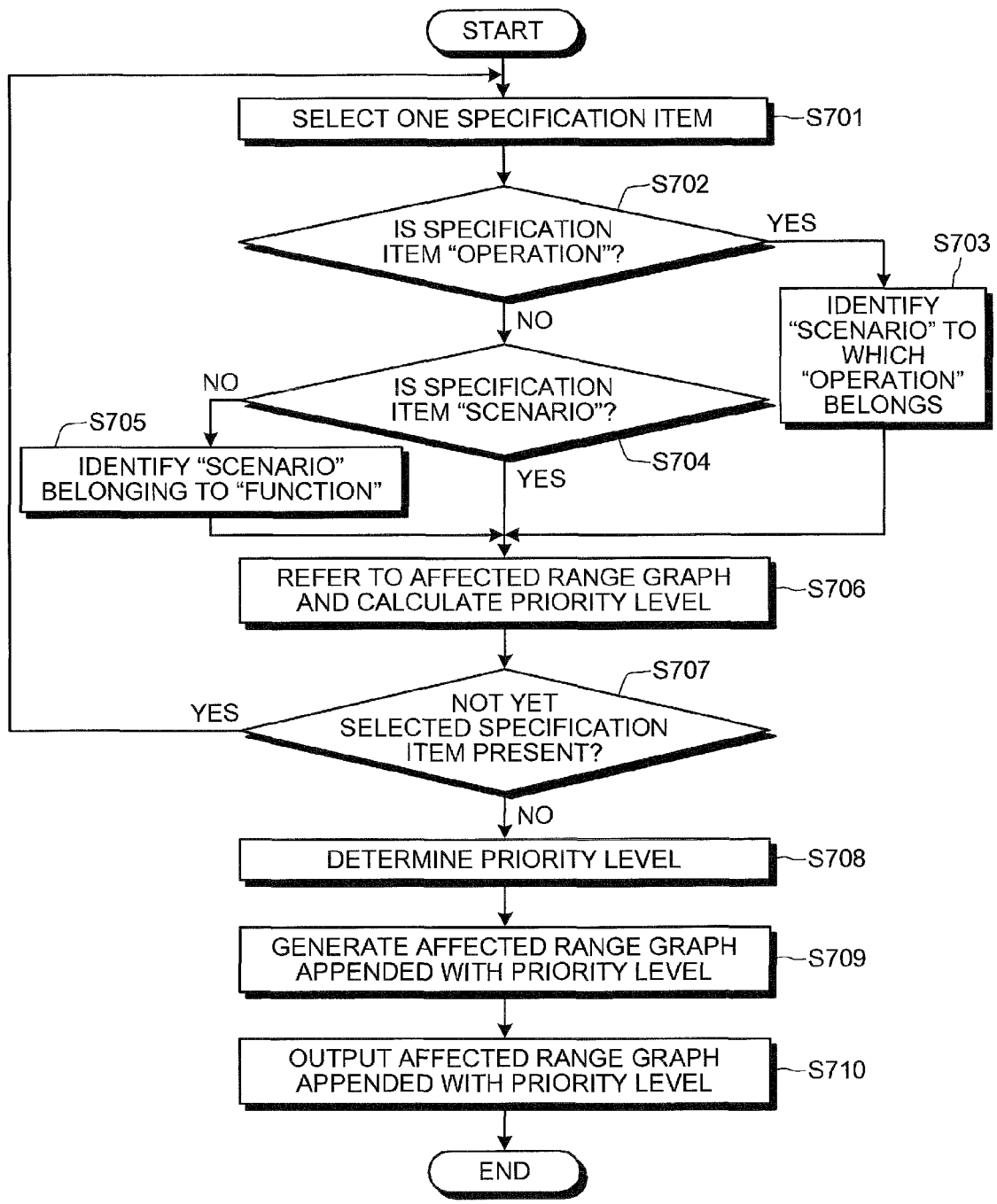
FIG. 7 is another flowchart of an example of a verification support procedure by the verification support apparatus.

FIG. 7 is another flowchart of an example of a verification support procedure by the verification support apparatus. As depicted in FIG. 7, the selecting unit 403 selects one specification item from among the areas identified at step S602 depicted in FIG. 6 (step S701).

The selecting unit 403 then determines whether the selected specification item is "operation" (step S702). When the specification item is "operation" (step S702: YES), the selecting unit 403 refers to the specification M1 to identify a "scenario" to which the "operation" belongs (step S703), after which the procedure proceeds to step S706.

When the specification item is not "operation" (step S702: NO), the selecting unit 403 determines whether the specification item is "scenario" (step S704). When the specification item is not "scenario" (step S704: NO), the selecting unit 403 refers to the specification M1 to identify a "scenario" that belongs to a "function" represented by the specification item (step S705), after which the procedure proceeds to step S706.

When the specification item is "scenario" (step S704: YES), the searching unit 404 refers to the affected range graph generated at step S611 depicted in FIG. 6 and based on the number of transitions made between the selected "scenario" (or the "scenario" identified at step S703 or at step S705) and another "scenario" to be reached (on the route searched out at step S609 of FIG. 6) (step S706), calculates priority levels representing the necessity of verification for each "scenario".

Subsequently, whether a specification item that has yet to be selected is present among the changed areas is determined (step S707). When a specification item is present (step S707: YES), the procedure returns to step S701, where one specification item is selected from among specification items that have yet to be selected.

When no specification item that has yet to be selected remains (step S707: NO), the determining unit 408 determines a priority level representing the necessity of verification of a "scenario" (step S708). Specifically, when plural priority levels have been calculated for one "scenario" by multiple calculations at step S706, the priority level of the "scenario" is determined by relatively evaluating the plural priority levels. When the priority level of one "scenario" is calculated only once, the priority level resulting from the calculation is determined to be the priority level of the "scenario".

Subsequently, the generating unit 405 generates an affected range graph on which the priority level determined by the determining unit 408 is appended to each "scenario" on the graph (step S709). The output unit 406 then outputs the generated affected range graph with priorities appended thereto (step S710) to end a series of processes according to the flowchart.

As described above, the present embodiment enables comprehensive identification of a function that is affected directly or indirectly by a specification change in a subject to be verified, i.e., a function having a high possibility of developing trouble because of the specification change. Thus, test scenarios needed for re-verification of the subject can be narrowed down.

A priority level representing the level of necessity of re-verification is calculated to specify the priority order of a test scenario belonging to each scenario. A priority level is calculated for each scenario for a function that is affected directly or indirectly by the specification change in the subject to be verified. Thus, by referring to the priority order of test scenarios, the designer can further narrow down test scenarios needed for re-verification of the subject to be verified.

For example, when a longer verification period can be afforded, after the test scenarios have been narrowed down to those needed for re-verification of the subject, all of those needed are executed to enable verification of every possible occurrence of trouble. When a longer verification period can not be afforded to enable execution of all the test scenarios narrowed down to those that are needed, test scenarios having higher priority orders (e.g., test scenarios having the three highest priority ranks) are executed to verify a possible occurrence of severe trouble.

Thus, according to the present embodiment, the priority order of test scenarios is recalculated in line with a specification change in a subject to be verified. Thus, the test scenarios needed for re-verification can be narrowed down to improve the efficiency of verification work and shorten a design period.

A direct memory access (DMA) transfer control function of a DMA controller to be verified is described as an example. In DMA transfer, data transfer using up to four channels can be programmed and the priority order of the channels can be set.

Parameter input values for the use of the function represent a channel used for data transfer (initial value is "0" and any one of "0 to 3" can be set as a design value for a channel), the priority order of a channel (initial value is "0" and "0 or 1" can be set for a channel as a priority level), the address of a transfer origin, the address of a transfer destination, the size of transfer data (limited to multiples of 16 up to 1024), and a transfer start bit and transfer end bit (initial value is "0" and a bit equivalent to a channel ending data transfer becomes to "1" after the end of data transfer). A parameter output value represents a transfer end flag for each channel.

FIG. 8 is a view of a pre-change specification of a DMA controller, the pre-change specification being a specification before a specification change in the DMA controller. As depicted in FIG. 8, the DMA controller functions of controlling DMA transfer are written in the specification M2 in XML. FIG. 8 depicts a portion of the specification M2.

Figure 9:
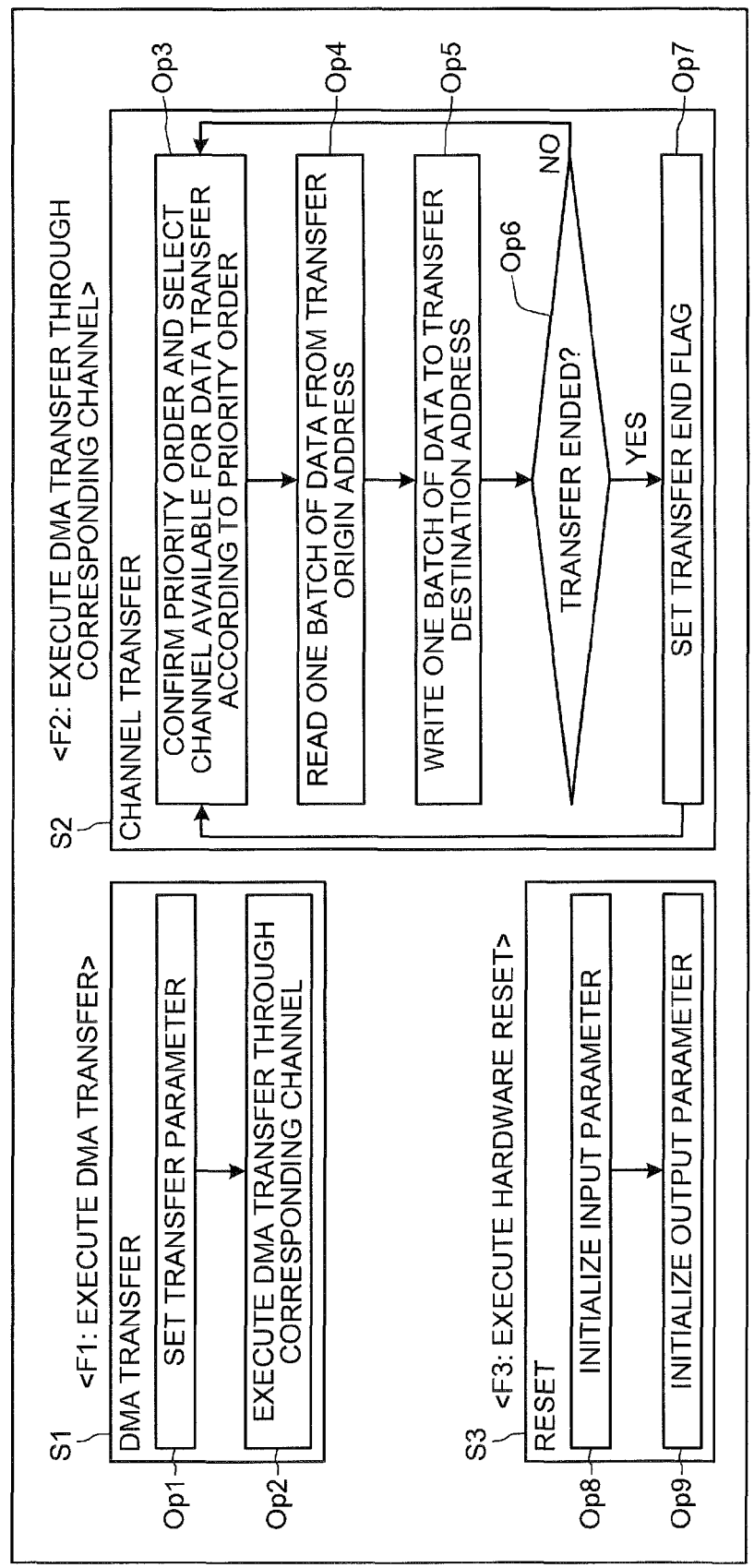
FIG. 9 is a view of scenarios of the DMA controller.

A scenario that defines a series of operations to be executed to implement each of the DMA controller functions of controlling DMA transfer are described. FIG. 9 is a view of scenarios of the DMA controller. As depicted in FIG. 9, a scenario S1 "DMA transfer" is a scenario that defines operations Op1 and Op2 that are executed to implement a function F1 "execute DMA transfer".

A scenario S2 "channel transfer" is a scenario that defines operations Op3 to Op7 that are executed to implement a function F2 "execute DMA transfer through corresponding channel". A scenario S3 "Reset" is a scenario that defines operations Op8 and Op9 that are executed to implement a function F3 "execute hardware reset".

Figure 10:
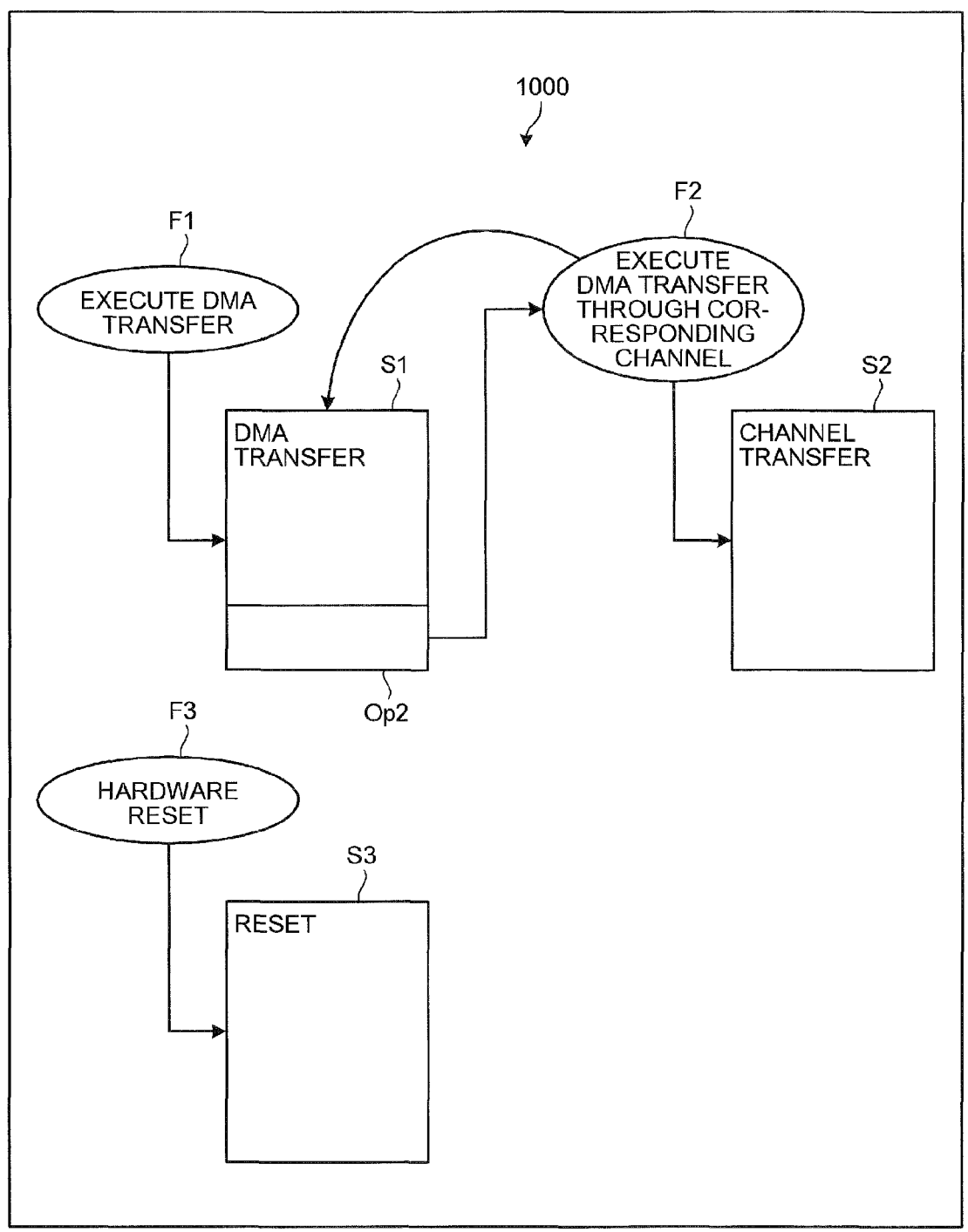
FIG. 10 is a transition graph that expresses a modeled form of specifications of the DMA controller.

FIG. 10 is a transition graph that expresses a modeled form of specifications of the DMA controller. Some links in FIG. 10 are omitted from the description for simplicity.

As depicted in FIG. 10, a transition graph 1000 is a directional graph that expresses transition between the functions F1 to F3 and the scenarios S1 to S3 of the DMA controller. The transition from the scenario S1 to the function F2 indicates that the function F2 is called up by execution of the operation Op2. Reference to the transition graph 1000 enables the recognition of the link relations between the functions F1 to F3 and the scenarios S1 to S3.

First to third examples of the present embodiment will hereinafter be described using the above working case (DMA controller). In the following description, constituent elements identical to those described in the embodiment above are given identical reference numerals, and description thereof is omitted hereinafter.

In the first example described, a new function is added as a result of a specification change in the DMA controller. Specifically, a function of "interruption generation" is added, a parameter "flag using interruption" is added to input parameters, and a parameter "interruption signal (interruption factor)" is added to output parameters.

FIG. 11 is a view of a post-change specification of the DMA controller, the post-change specification being a specification after a specification change in the DMA controller. As depicted in FIG. 11, the DMA transfer control functions of the post-change DMA controller after the specification change are written in the specification M1 in XML. FIG. 11 depicts a portion of the specification M1.

In this case, a specification change (denoted by a reference numeral 1101 in FIG. 11) is made to add a function of "interruption generation" to the DMA controller to be verified. Besides the addition of the function of "interruption generation", an addition of scenarios (scenarios S4 and S5 depicted in FIG. 12) and a change of an execution condition, which will be described later, are also carried out. In addition, a parameter "flag using interruption" is added to input parameters and a parameter "interruption signal" is added to output parameters.

Figure 12:
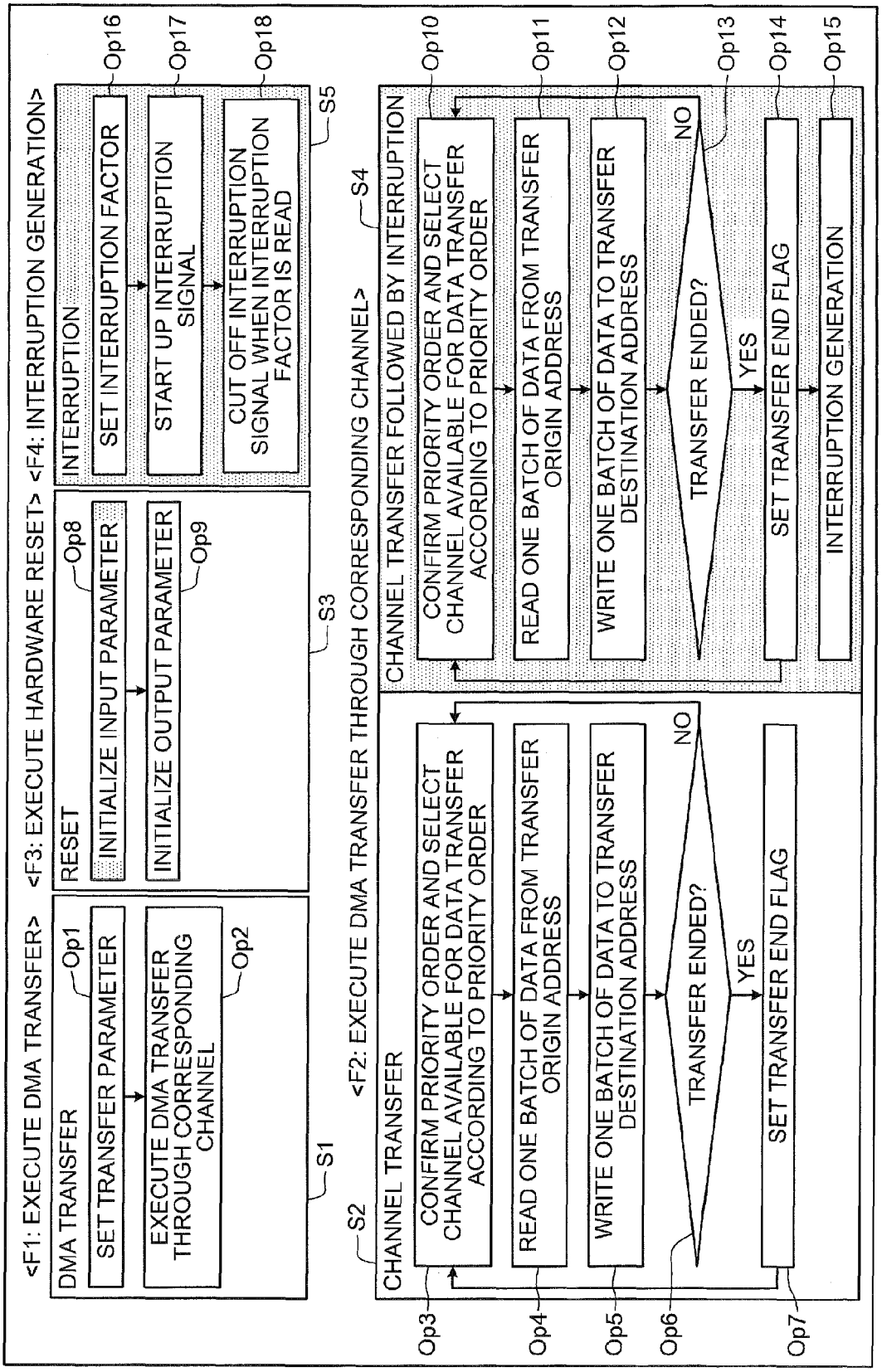
FIG. 12 is a view of scenarios of the DMA controller of a first example.

A scenario that defines a series of operations to be executed to implement each of the functions of the first example are described. FIG. 12 is a view of scenarios of the DMA controller of the first example. As depicted in FIG. 12, the scenarios S4 and S5 are added as a result of a specification change in the DMA controller.

The scenario S4 "channel transfer followed by interruption" is a scenario that defines operations Op10 to Op15 that are executed to implement the function F2 "execute DMA transfer through corresponding channel". The scenario S5 "interruption" is the scenario that defines operations Op16 to Op18 that are executed to implement the function F4 "interruption generation". A pre-condition for the scenario S2 is changed.

Figure 13:
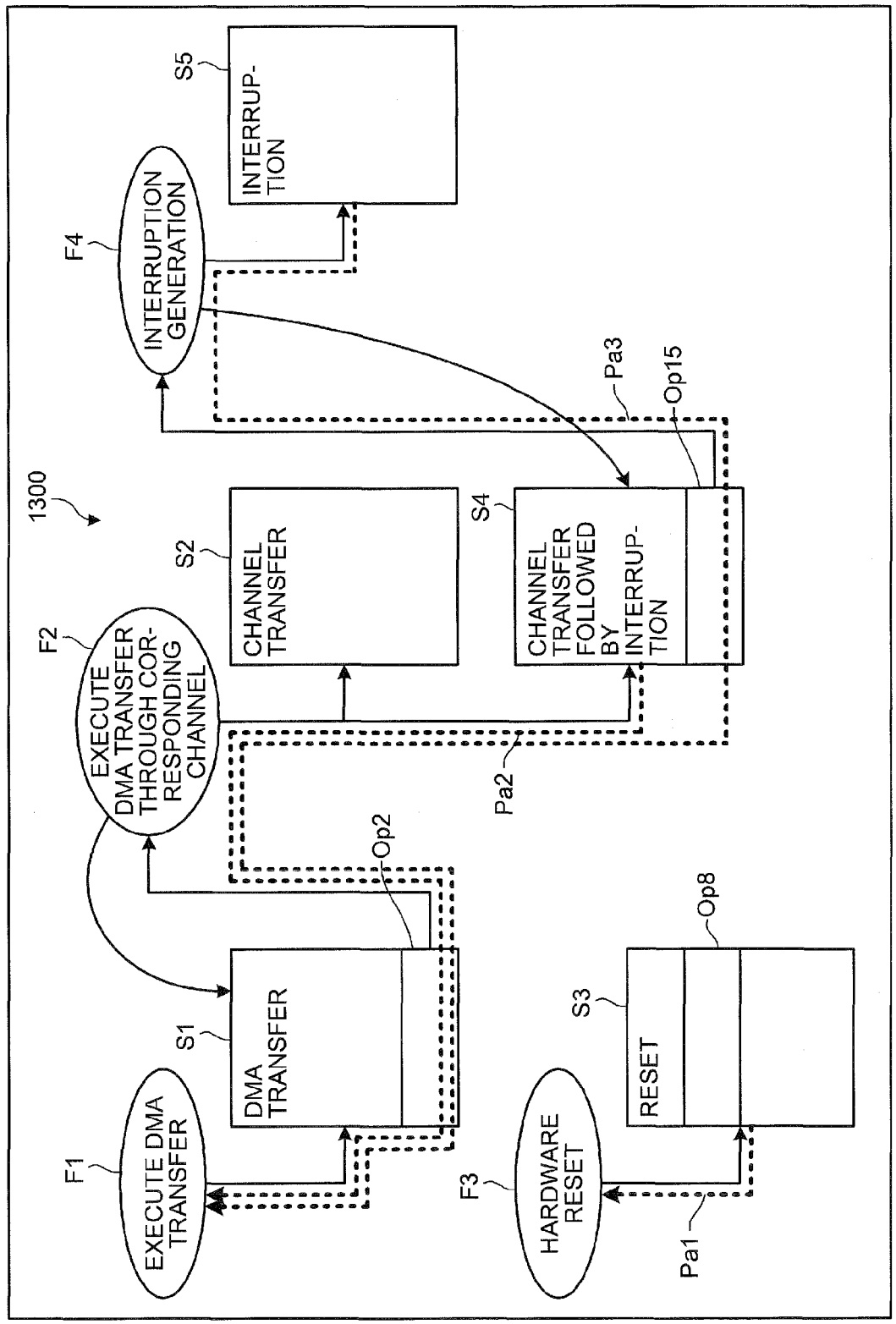
FIG. 13 is a transition graph that expresses a modeled form of specifications of the DMA controller of the first example.

A transition graph that expresses a modeled form of specifications written in the specification M1 of FIG. 11 will then be described. FIG. 13 is a transition graph that expresses a modeled form of specifications of the DMA controller of the first example. Some links in FIG. 13 are omitted from the description for simplicity.

As depicted in FIG. 13, a transition graph 1300 is a directional graph that expresses transition between the functions F1 to F4 and the scenarios S1 to S5 of the DMA controller. The transition from the scenario S4 to the function F4 indicates that the function F4 is called up by execution of the operation Op15. Reference to the transition graph 1300 enables link relations between the functions F1 to F4 and the scenarios S1 to S4 to be recognized.

A difference set representing changed areas identified by the identifying unit 402 are described. FIG. 14 is a view of a difference set of the first example. As depicted in FIG. 14, a difference set 1400 is a set of specification items that represent differences between the specification M2 depicted in FIG. 8 and the specification M1 depicted in FIG. 11. FIG. 14 depicts a portion of the difference set.

In the difference set 1400, a specification item with "+" appended to the head of the line "<Postcondition> input parameter and interruption flag are 0</Postcondition>" is a specification item that is written in the post-change specification M1 only. A specification item with "−" appended to the head of the line "<Postcondition> input parameter is 0</Postcondition>" is a specification item that is written in the pre-change specification M2 only.

The position of each specification item (difference item) in the specifications M1 and M2 can be identified by referring to the number of lines written in "@@ ... @@" in the difference set 1400 and using a software library, etc., for operating XML description.

A series of processes for generating an affected range graph is described. The selecting unit 403 selects one specification item from among the difference set 1400. When a specification item representing an operation Op8 is selected, the scenario S3 to which the operation Op8 belongs is identified. Specifically, the scenario S3 is identified using a software library, etc., for operating XML description.

Subsequently, the searching unit 404 identifies a function that refers to the scenario S3. Specifically, the searching unit 404 identifies the function by referring to an XML tag <ReferencedScenario> under the function F3 to which the scenario S3 belongs in the specification M1. In this case, the function that refers to the scenario S3 "Reset" is not present. Because of this, the searching unit 404 refers to the transition graph 1300 to search for a route Pa1 affected by the specification change (see FIG. 13).

Then, when the selecting unit 403 selects, from among the difference set 1400, a specification item representing the scenario S4, the searching unit 404 identifies a function and a scenario that refer to the scenario S4. Specifically, the searching unit 404 identifies the function and the scenario by referring to an XML tag <ReferencedScenario> under the function F2 to which the scenario S4 belongs in the specification M1.

In this case, the scenario S1 (under the function F1) that refers to the scenario S4 is identified. The searching unit 404 then identifies a function and a scenario that refer to a scenario under the function F1 (which is only the identified scenario S1). In this case, the function and the scenario that refer to the scenario S1 are not present. Because of this, the searching unit 404 refers to the transition graph 1300 to search for a route Pa2 affected by the specification change (see FIG. 13).

When a specification item representing the function F4 is selected by the selecting unit 403 from among the difference set 1400, the scenario S5 under the function F4 is identified. Specifically, the scenario S5 is identified by using a software library, etc., for operating XML description. Subsequently, the searching unit 404 identifies a function and a scenario that refer to the scenario S5. Specifically, the searching unit 404 identifies the function and the scenario by referring to an XML tag <ReferencedScenario> under the function F4 to which the scenario S5 belongs in the specification M1.

In this case, the scenario S4 (under the function F2) that refers to the scenario S5 is identified. The searching unit 404 then identifies a function and a scenario that refer to the scenarios S2 and S4 under the function F2. In this case, the scenario S1 that refers to the scenario S4 is identified. As a result, the searching unit 404 refers to the transition graph 1300 to search for a route Pa3 affected by the specification change (see FIG. 13).

Through the process above, each changed area is selected by the selecting unit 403 from among the difference set 1400.

Finally, the routes Pa1, Pa2, and Pa3 retrieved by the searching unit 404 are connected to make an affected range graph 1500 (see FIG. 15 to be described later) in which specification items (functions and scenarios) affected by a specification change (addition of the "interruption generation" function) are indicated as nodes.

Figure 15:
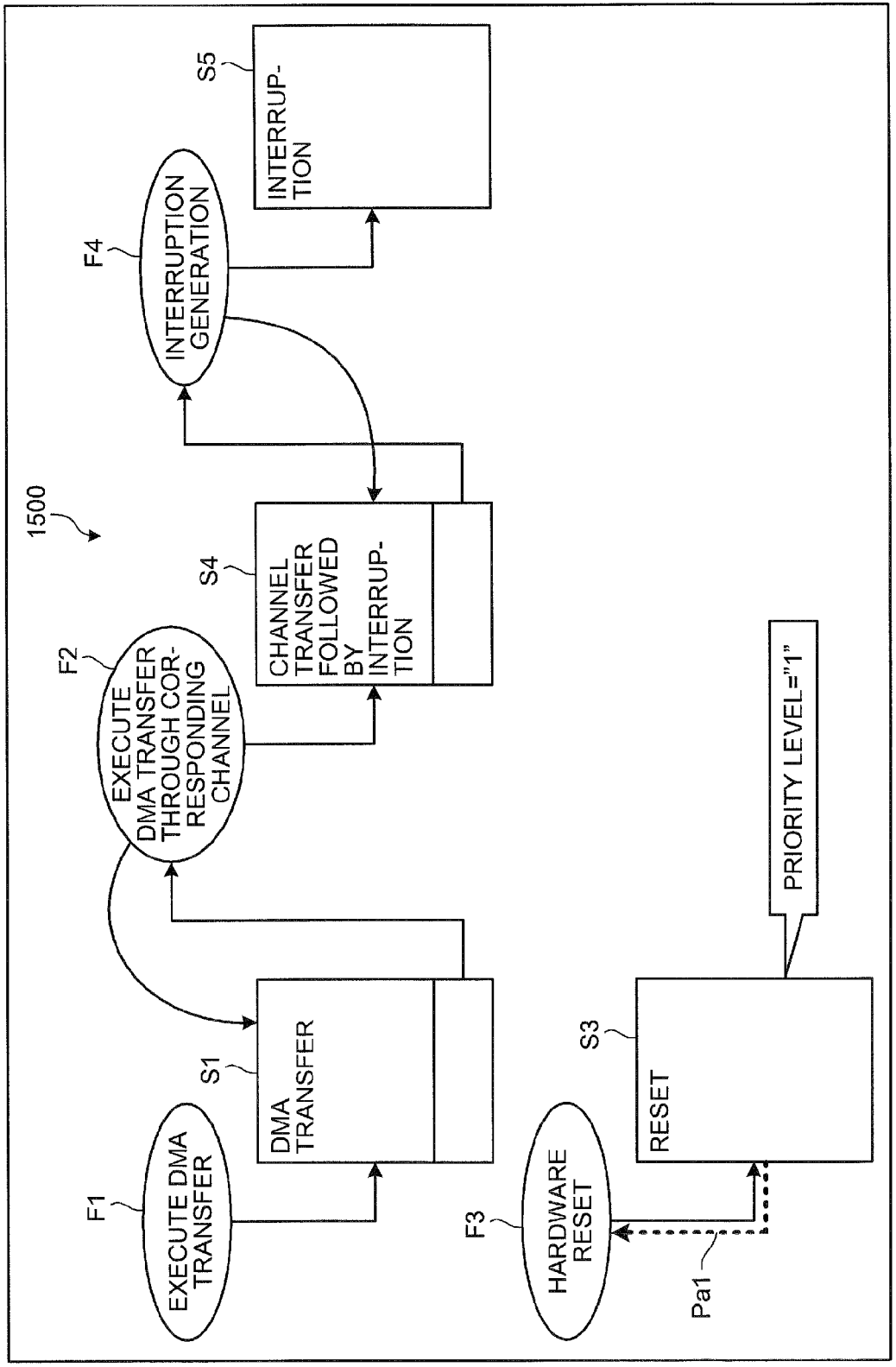
FIGS. 15 to 17 are schematics of priority assigning processes according to a first embodiment.
Figure 16:
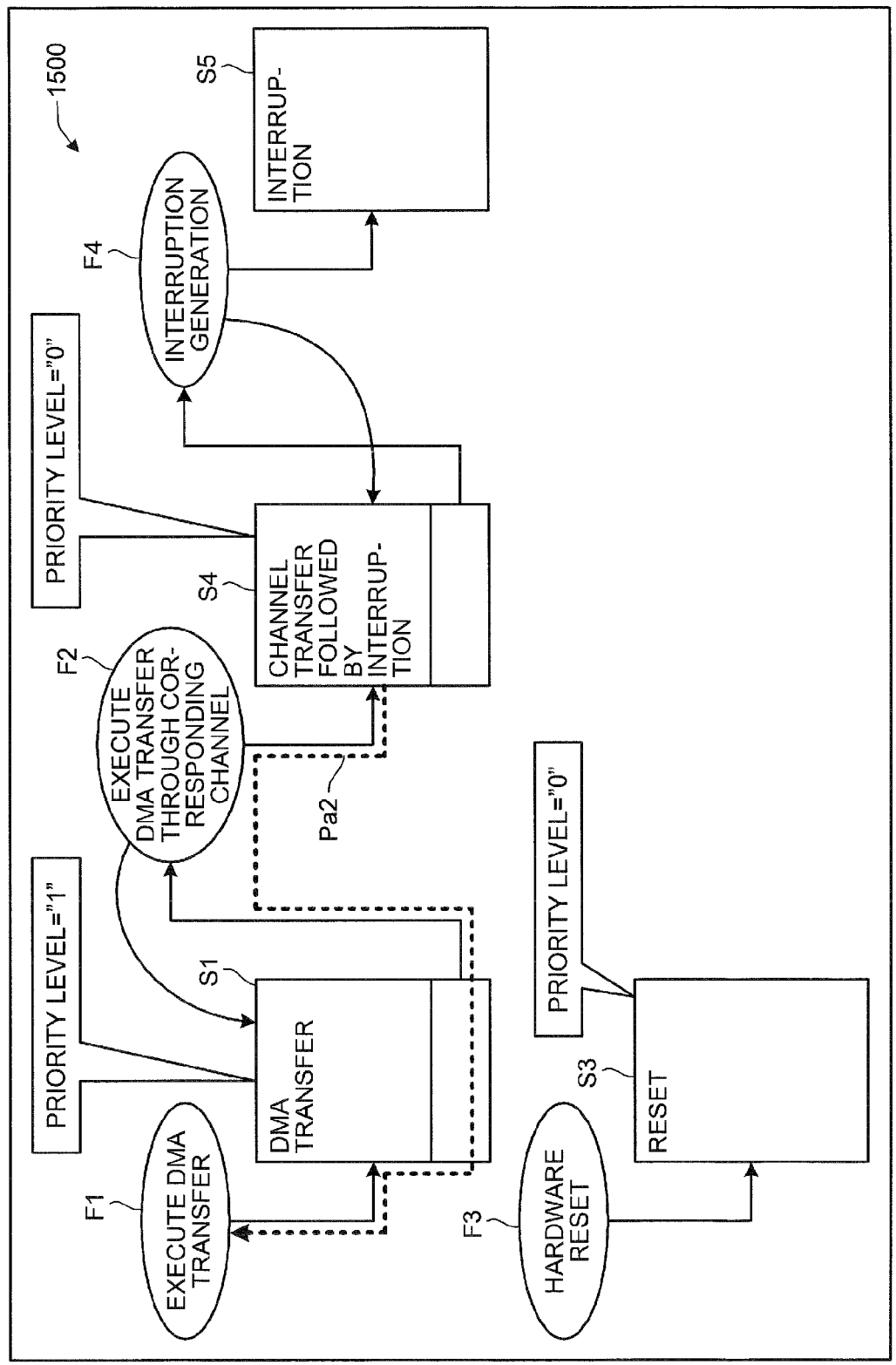
Figure 17:
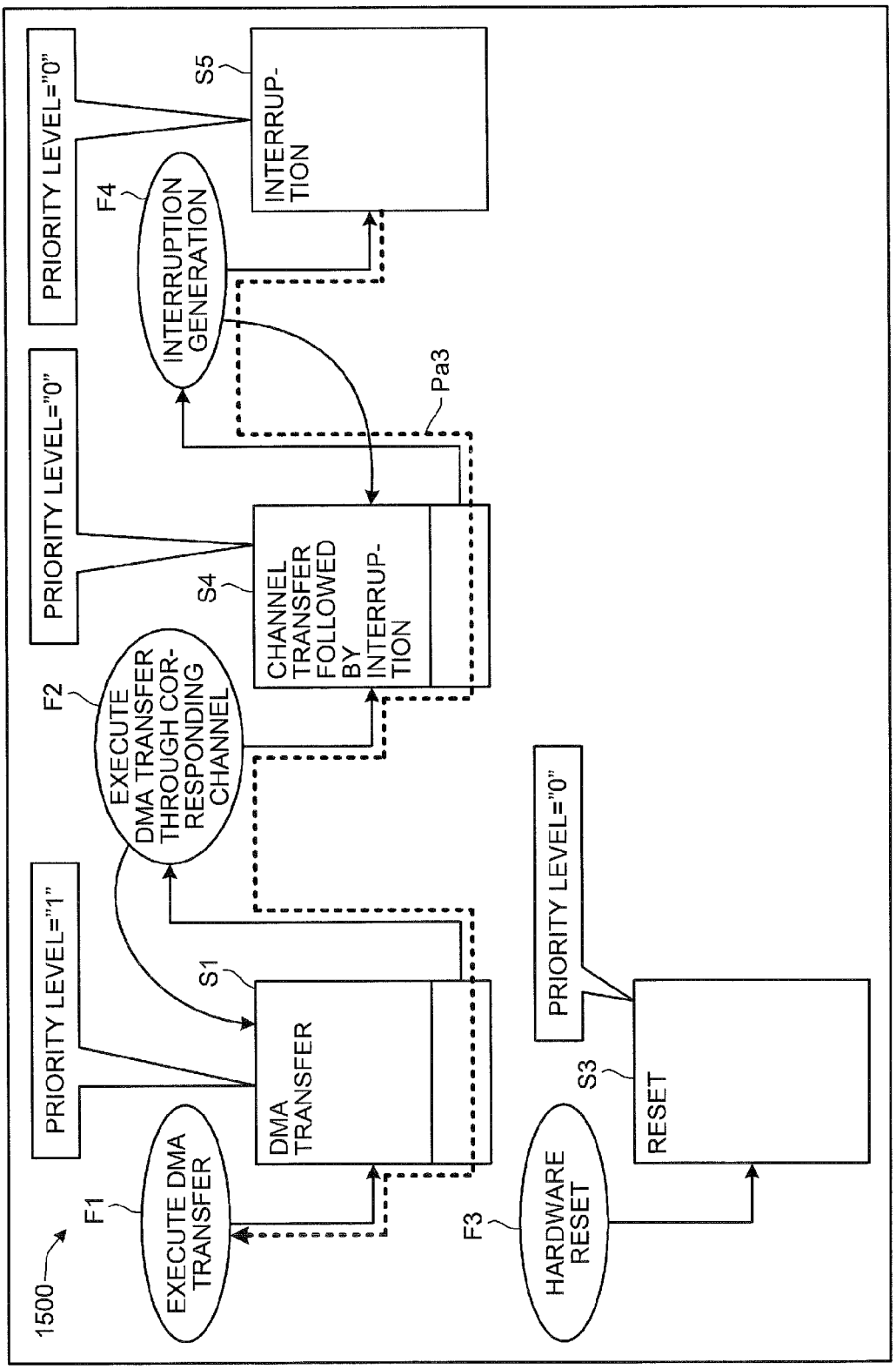

FIGS. 15 to 17 are schematics of priority assigning processes according to the first embodiment. In the following processes, priority levels are given to specification items representing scenarios on the routes Pa1, Pa2, and Pa3 retrieved by the searching unit 404 (where specification items representing functions are simply regarded as relay points). Priority levels are indicated by integers including "0". The lower an integer value, the higher a priority order.

Specifically, links are traced backward from a specification item that is a starting point on each of the routes Pa1, Pa2, and Pa3 in the affected range graph 1500 to obtain a priority level based on the number of transitions that are made from the starting point specification item. The calculation unit 407 calculates the priority level of each scenario at "0, 1, . . . " in ascending order of the transitions. The starting point specification item is the specification item that represents a scenario identified from one specification item selected by the selecting unit 403.

In FIG. 15, the scenario S3 is the starting point of the route Pa1. In this case, a link between the function F3 to which the scenario S3 belongs and another scenario is not present, so that a priority level is given to the scenario S3 only. The value of the priority level is "0" because the number of transitions made from the scenario S3 is zero.

In FIG. 16, the scenario S4 is the starting point of the route Pa2. In this case, tracing links backward from the scenario S4 on the route Pa2 brings a result of "scenario S4 '0'→function F2 '1'→scenario S1 '2'→function F1 '3'" (numerical values in single quotation marks indicate the number of transitions). As a result, the priority level of the scenario S4 is determined to be "0", and that for the scenario S1 is determined to be "1".

Finally, in FIG. 17, the scenario S5 is the starting point of the route Pa3. In this case, tracing links backward from the scenario S5 on the route Pa3 brings a result of "scenario S5 '0'→function F4 '1'→scenario S4 '2'→function F2 '3'→scenario S1 '4'→function F1 '5'" (numerical values in the single quotation marks represent the number of transitions).

For the scenarios S4 and S1 that already have been given priority levels, the determining unit 408 determines priority levels smaller in value to be the priority levels of the scenarios S4 and S1. As a result, the priority level of the scenario S5 is determined to be "0", that of the scenario S4 is determined to be "0", and that of the scenario S1 is determined to be "1".

In this case, by referring to the affected range graph 1500 with priority levels appended thereto, the designer is able to grasp that the priority of test scenarios belonging to the scenarios S3, S4, and S5 is the highest, and the priority of a test scenario belonging to the scenario S1 is the second highest.

In the second example described, an operation is changed resulting from a specification change in the DMA controller. Specifically, the number of channels that can be set is changed from 4 to 8 and the effective range of a parameter is changed in DMA transfer.

Figure 18:
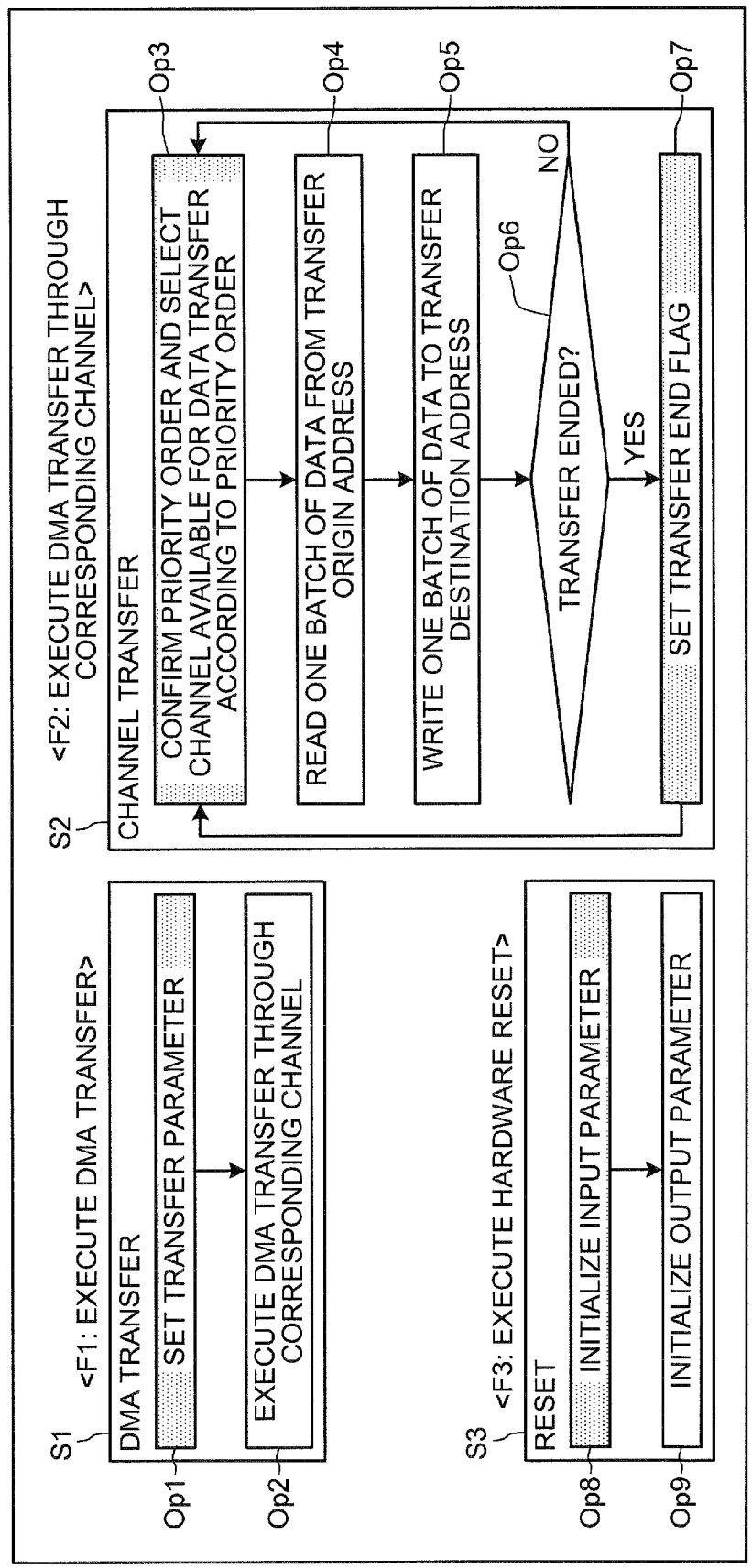
FIG. 18 is a view of scenarios of the DMA controller according to a second example.

A scenario that defines a series of operations to be executed to implement each of the functions of the second example are described. FIG. 18 is a view of scenarios of the DMA controller according to the second example. As depicted in FIG. 18, the effective ranges of input parameters of operations Op1, Op3, and Op8 are changed because of a specification change in the DMA controller. The effective range of an output parameter of an operation Op7 is also changed.

In this case, because the operations (Op1, Op3, Op7, and Op8) belonging to the scenarios S1 to S3 are changed, each of the scenarios S1 to S3 serves as the starting point for each of the routes that the searching unit 404 searches for. The priority level given to each of the S1 to S3 is, therefore, determined to be "0".

Figure 19:
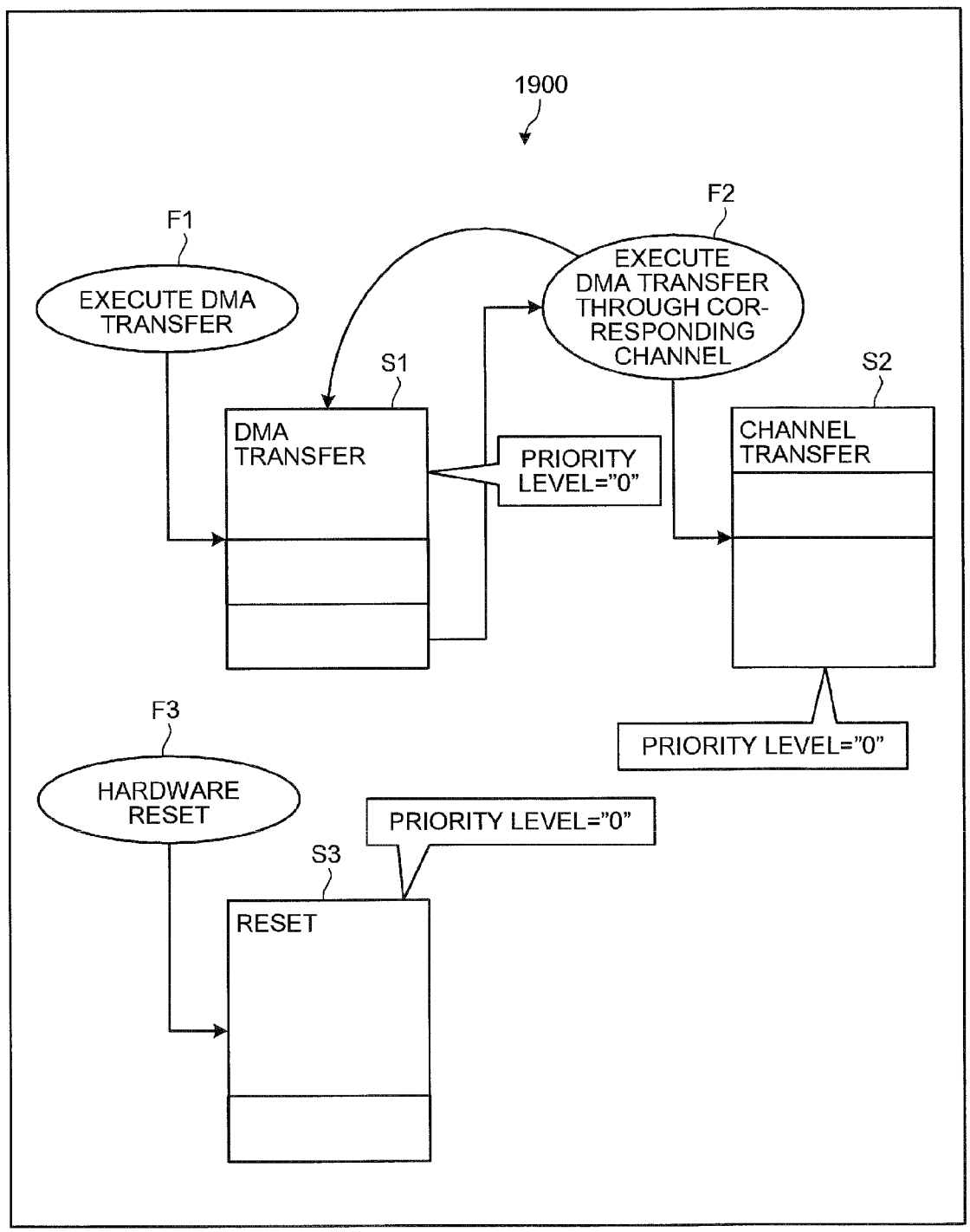
FIG. 19 is a view of an affected range graph according to a second embodiment.

FIG. 19 is a view of an affected range graph according to the second embodiment. As depicted in FIG. 19, a priority level of "0" is given to each of the scenarios S1, S2, and S3 on an affected range graph 1900. In this case, by referring to the affected range graph 1900, the designer is able to grasp that the priority of test scenarios belonging to the scenarios S1 to S3 are all high.

In the third example described, a scenario is changed resulting from a specification change in the DMA controller. Specifically, the effective range of a transfer origin address and transfer destination address that are parameter input values upon the use of a function are changed, and an error flag that is a parameter output value in the use of a function is newly added.

Figure 20:
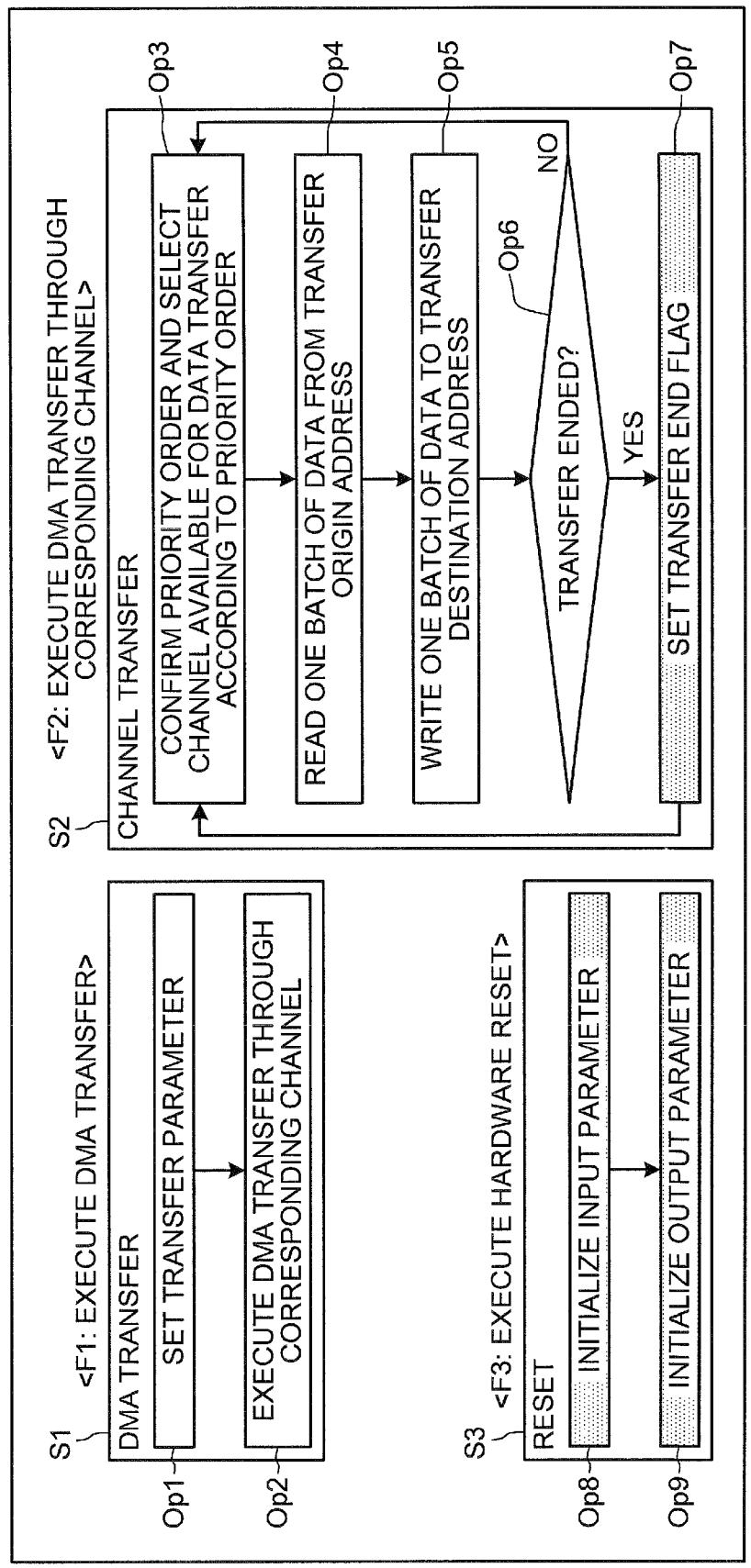
FIGS. 20 and 21 are views of scenarios of the DMA controller of a third example.
Figure 21:
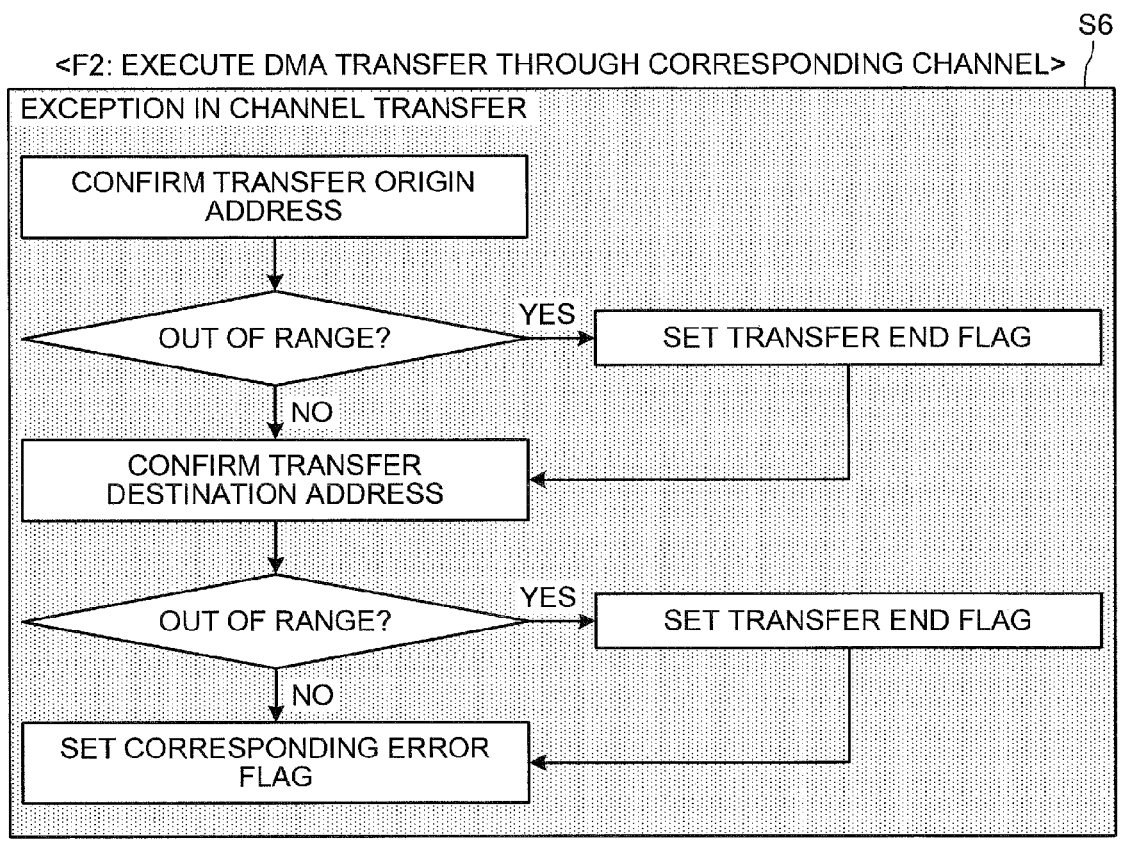

A scenario that defines a series of operations to be executed to implement each of the functions according to the third example are described. FIGS. 20 and 21 are views of scenarios of the DMA controller of the third example.

As depicted in FIG. 20, a pre-condition and a post-condition for the scenario S2 are changed as a result of a specification change in the DMA controller. The effective range of an output parameter of the operation Op7 is also changed. In addition, the effective range and the initial value of an input parameter of the operation Op8 is changed, and the effective range and the initial value of an output parameter of the operation Op9 is also changed.

As depicted in FIG. 21, a new scenario S6 is added as a result of the specification change in the DMA controller. In this case, the scenario S2 serves as the starting point of a route that the searching unit 404 searches for because the pre-condition and post-condition are changed and the effective range of the output parameter of the operation Op7 is changed.

The scenario S3 serves as the starting point of a route that the searching unit 404 searches for because the effective range and the initial value of the input parameter of the operation Op8 is changed and the effective range and the initial value of the output parameter of the operation Op9 is changed. The scenario S6 serves as the starting point of a route that the searching unit 404 searches for because the scenario S6 is a newly added scenario. A priority level given to each of the scenarios S2, S3, and S6 is, therefore, determined to be "0".

Because the scenario S1 refers to the scenario S6 under the function F2 (on the assumption that the scenario S1 is written in an XML tag <ReferencedScenario> under the function F2 in the specification M1), the scenario S1 is the origin of transition to the scenario S6. A priority level given to the scenario S1 is, therefore, determined to be "1".

Figure 22:
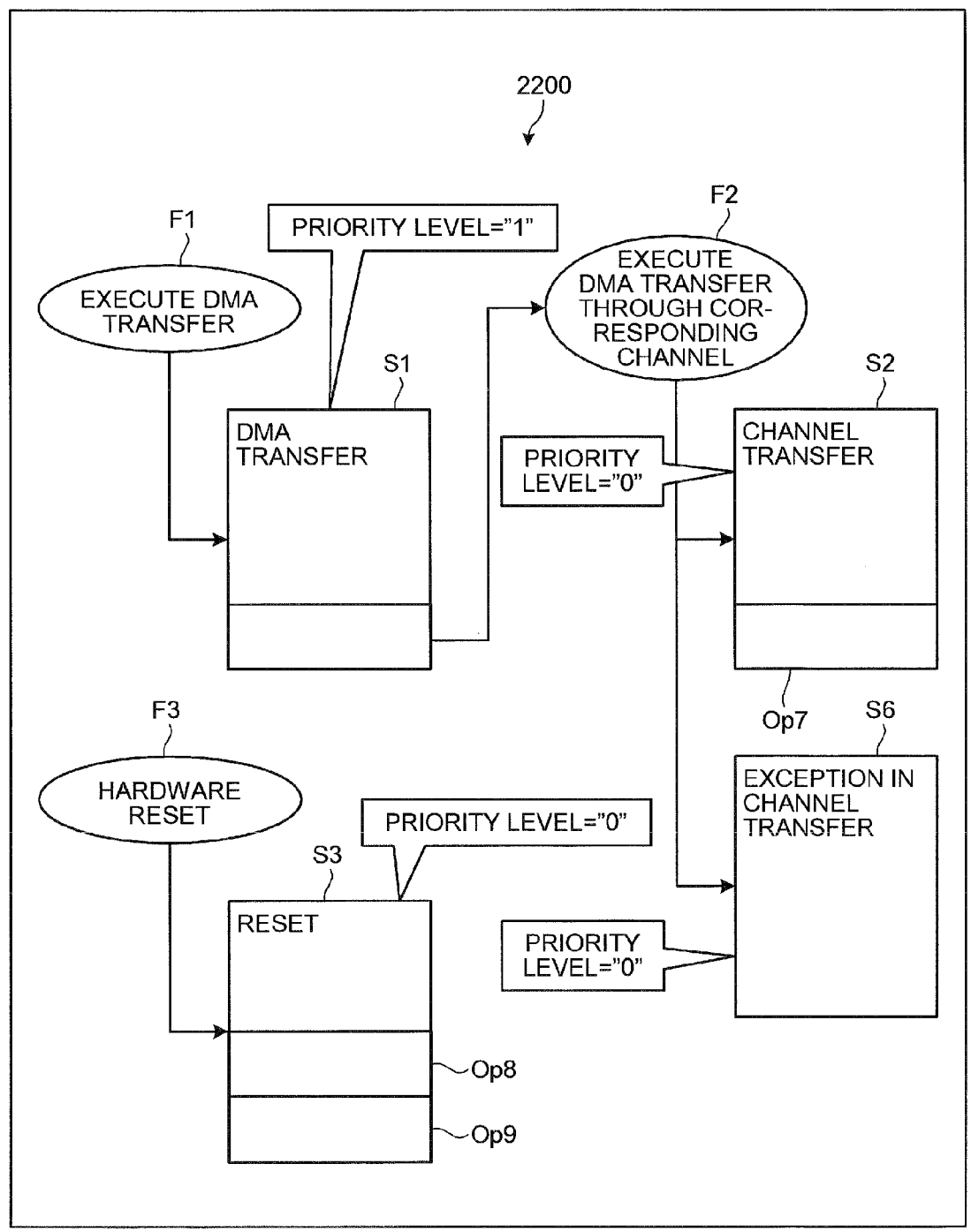
FIG. 22 is a view of an affected range graph of a third embodiment.

FIG. 22 is a view of an affected range graph of the third embodiment. As depicted in FIG. 22, a priority level of "0" is given to each of the scenarios S2, S3, and S6 in an affected range graph 2200, while a priority level of "1" is given to the scenario S1. In this case, by referring to the affected range graph 2200, the designer is able to grasp that the priority of test scenarios belonging to the scenarios S2, S3, and S6 is the highest, and the priority of a test scenario belonging to the scenario S1 is the second highest.

The verification support method explained in the present embodiment can be implemented by a computer, such as a personal computer and a workstation, executing a program that is prepared in advance. The program is recorded on a computer-readable recording medium such as a hard disk, a flexible disk, a compact disk read-only memory (CD-ROM), a magneto optical disk (MO), and a digital versatile disk (DVD), and is executed by being read out from the recording medium by a computer. The program can be a transmission medium that can be distributed through a network such as the Internet.

The verification support apparatus 100 described in the present embodiment can be realized by an application specific integrated circuit (ASIC) such as a standard cell or a structured ASIC or a programmable logic device (PLD) such as a field-programmable gate array (FPGA). Specifically, for example, the functions of the verification support apparatus (input unit 401 to determining unit 408) are defined in hardware description language (HDL), which is logically synthesized and applied to the ASIC, the PLD, etc., thereby enabling fabrication of the verification support apparatus 100.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium stores therein a verification support program that causes a computer to execute:
    identifying, by using a pre-change specification and a post-change specification given before and after a specification change in a subject to be verified, an area that has changed from among a plurality of specification items included in the post-change specification;
    selecting a specification item from among the areas identified at the identifying;
    searching for, by referring a transition graph concerning the specification items included in the post-change specification and by tracing the specification items as origins of transitions from a starting point that is the specification item selected at the selecting, a route made up of specification items affected by the specification change;
    calculating, based on a number of transitions made between the specification item selected at the selecting and another specification item on the route retrieved at the searching, a priority level that represents a degree of necessity for verification of a specification item on the route; and
    outputting a search result of the searching and a calculation result of the calculating.

2. The computer-readable recording medium according to claim 1, wherein
    the verification support program further causes the computer to execute generating, based on the search result of the searching, an affected range graph in which specification items affected by the specification change are indicated as nodes, and
    the outputting includes outputting an affected range graph generated at the generating.

3. The computer-readable recording medium according to claim 2, wherein the generating includes generating, based on the search result of the searching, an affected range graph in which the specification items affected by the specification change are indicated as nodes and a priority level calculated for each of the specification items at the calculating is appended correspondingly to each of the nodes.

4. The computer-readable recording medium according to claim 1, wherein the calculating includes calculating a priority level of a specification item that is among specification items on the route and represents a scenario that defines a series of operations for implementing a function of the subject to be verified.

5. The computer-readable recording medium according to claim 1, wherein
    the verification support program further causes the computer to execute determining, when a plurality of priority levels for a given specification item on the route is calculated at the calculating, the priority level of the given specification item by relatively evaluating the priority levels for the given specification item, and
    the outputting includes outputting a determination result of the determining.

6. The computer-readable recording medium according to claim 1, wherein the searching, when a specification item representing a function of the subject to be verified is selected at the selecting, includes searching for a route for which a starting point is a specification item representing a scenario belonging to the function.

7. The computer-readable recording medium according to claim 1, wherein the searching, when a specification item representing an operation that is executed to implement a function of the subject to be verified is selected at the selecting, includes searching for a route for which a starting point is a specification item representing a scenario to which the operation belongs.

8. A verification support apparatus comprising:
    an identifying unit that, by using a pre-change specification and a post-change specification given before and after a specification change in a subject to be verified, identifies an area that has changed from among a plurality of specification items included in the post-change specification;
    a selecting unit that selects a specification item from among the areas identified by the identifying unit;
    a searching unit that, by referring a transition graph concerning the specification items included in the post-change specification and by tracing specification items as origins of transitions from a starting point that is the specification item selected by the selecting unit, searches for a route made up of specification items affected by the specification change;
    a calculating unit that calculates, based on a number of transitions made between the specification item selected by the selecting unit and another specification item on the route retrieved by the searching unit, a priority level that represents a degree of necessity for verification of a specification item on the route; and
    an output unit that outputs a search result of the searching unit and a calculation result of the calculating unit.

9. A verification support method comprising:
    identifying, by using a pre-change specification and a post-change specification given before and after a specification change in a subject to be verified, an area that has changed from among a plurality of specification items included in the post-change specification;
    selecting a specification item from among the areas identified at the identifying;
    searching for, by referring a transition graph concerning the specification items included in the post-change specification and by tracing specification items as origins of transitions from a starting point that is the specification item selected at the selecting, a route made up of specification items affected by the specification change;

calculating, based on a number of transitions made between the specification item selected at the selecting and another specification item on the route retrieved at the searching, a priority level that represents a degree of necessity for verification of a specification item on the route; and outputting a search result of the searching and a calculation result of the calculating.

* * * * *